US012595134B2

(12) United States Patent
Wallace et al.

(10) Patent No.: US 12,595,134 B2
(45) Date of Patent: Apr. 7, 2026

(54) TOPOGRAPHICAL MONITORING OF CONVEYOR BELT SURFACE AND ROOT CAUSE DETERMINATION

(71) Applicant: ContiTech Transportbandsysteme GmbH, Hannover (DE)

(72) Inventors: Jack Bruce Wallace, Powell, OH (US); Jacques Frederick Basson, Braga (PT); Patrick Raffler, Duderstadt (DE); Gregor Hadasch, Wollbrandshausen (DE); Atrayee Neog, Hamburg (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 234 days.

(21) Appl. No.: 18/503,010

(22) Filed: Nov. 6, 2023

(65) Prior Publication Data

US 2025/0145383 A1     May 8, 2025

(51) Int. Cl.
*B65G 43/02* (2006.01)

(52) U.S. Cl.
CPC ...... *B65G 43/02* (2013.01); *B65G 2203/0275* (2013.01); *B65G 2203/044* (2013.01); *B65G 2203/046* (2013.01)

(58) Field of Classification Search
CPC ..................................................... B65G 43/02
USPC ..................................................... 198/810.02
See application file for complete search history.

(56) References Cited

U.S. PATENT DOCUMENTS

| | | | | |
|---|---|---|---|---|
| 9,988,217 B2 * | 6/2018 | Hou | ........................ | B65G 43/02 |
| 10,046,918 B2 * | 8/2018 | Da Silva | ................ | B65G 43/02 |
| 10,660,266 B2 * | 5/2020 | Wallace | ................ | G01B 7/046 |
| 10,829,310 B2 * | 11/2020 | Sakaguchi | ............ | G06Q 10/20 |
| 10,865,051 B2 * | 12/2020 | Hou | ........................ | G06Q 10/20 |
| 11,208,269 B2 * | 12/2021 | Onishi | ................... | B65G 17/38 |
| 11,401,113 B2 * | 8/2022 | Polak | ........................ | G06T 7/11 |
| 2003/0168317 A1 | 9/2003 | Fromme et al. | | |
| 2012/0286948 A1 * | 11/2012 | Ganapathy et al. | | |
| 2019/0144209 A1 * | 5/2019 | Happe | | |
| 2022/0009721 A1 | 1/2022 | Wallace et al. | | |

FOREIGN PATENT DOCUMENTS

| | | | | |
|---|---|---|---|---|
| CN | 111591716 A | 8/2020 | | |
| WO | WO-2022118150 A1 * | 6/2022 | ............... | G06N 3/02 |
| WO | 2025027104 A1 | 2/2025 | | |

OTHER PUBLICATIONS

LMI Technologies / Advancing Quality and Productivity With 3D Sensor Technology / 2021.
ROXON; retrieved online: https://roxon.com/hx-products/ / Jun. 11, 2023.

(Continued)

*Primary Examiner* — Douglas A Hess
(74) *Attorney, Agent, or Firm* — Lippes Mathias LLP

(57) ABSTRACT

A system for monitoring conveyor belts includes an emitter, a sensor and electronic circuitry. The emitter is configured to emit light at the surface of a conveyor belt. The sensor is configured to measure the light reflected from the belt surface. The circuitry is configured to identify a defect in or on the surface of the belt based on the light received from the sensor, and determine the source or cause of the observed surface defect. Machine learning including data from outside sources may be used in the root cause analysis.

18 Claims, 13 Drawing Sheets

(56)     References Cited

OTHER PUBLICATIONS

Continental / Conveyor Belt Protection Devices and Inspection Services / 2023.

Trybala Pawel et al., "Damage Detection Based on 3D Point Cloud Data Processing from Laser Scanning of Conveyor Belt Surface", Remote Sensing, vol. 13, No. 1, Dec. 25, 2020 (Dec. 25, 2020), pp. 1-19, XP093013990, DOI: 10.3390/rs13010055.

Bortnowski Piotr et al., "Types and causes of damage to the conveyor belt—Review, classification and mutual relations", vol. 140, Jun. 16, 2022 (Jun. 16, 2022), XP087147998, ISSN: 1350-6307, DOI: 10.1016/J. ENGFAILANAL.2022.106520.

Kirjanow-Blazej Agata et al., "Calibration procedure for ultrasonic sensors for precise thickness measurement", vol. 214, Mar. 24, 2023 (Mar. 24, 2023), XP087304707, ISSN: 0263-2241, DOI: 10. 1016/ J.EASUREMENT.2023.112744.

EP Search Report dated Mar. 19, 2025 of counterpart European Patent Application No. 24210324.0.

* cited by examiner

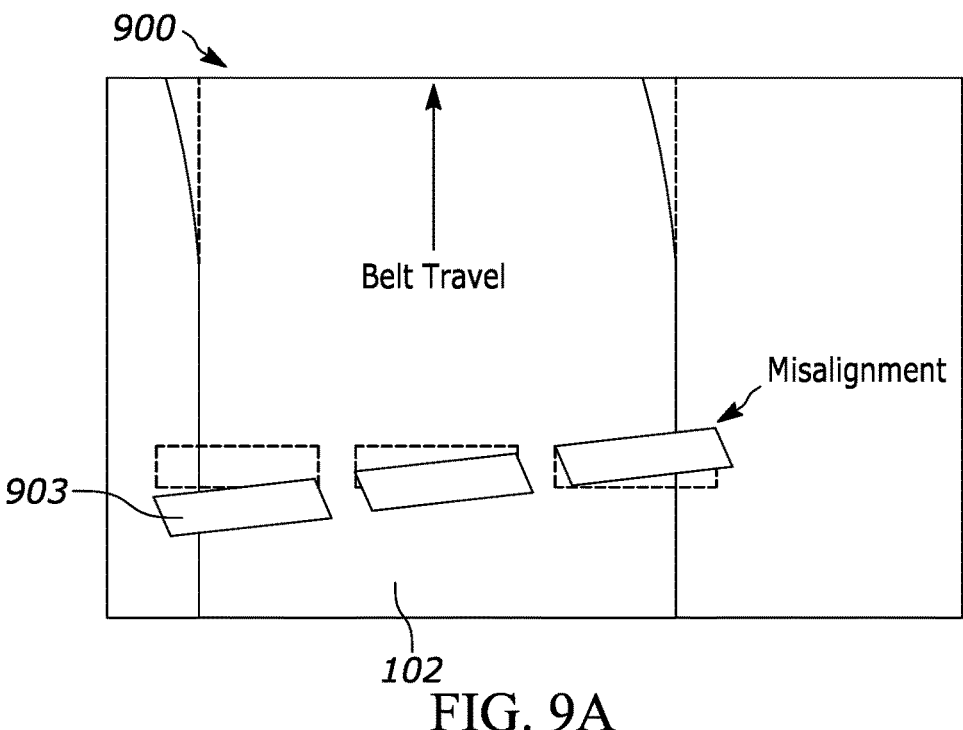
FIG. 9A
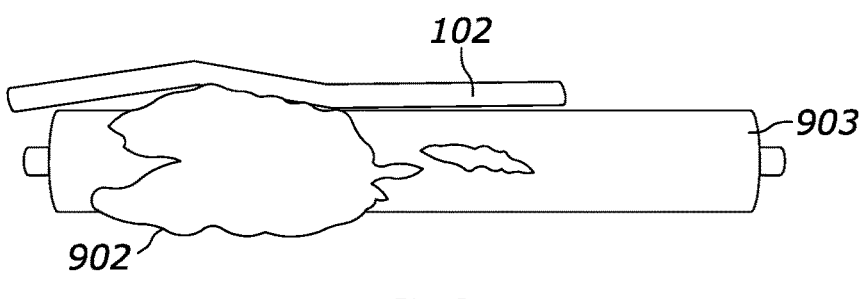
FIG. 9B
FIG. 9C

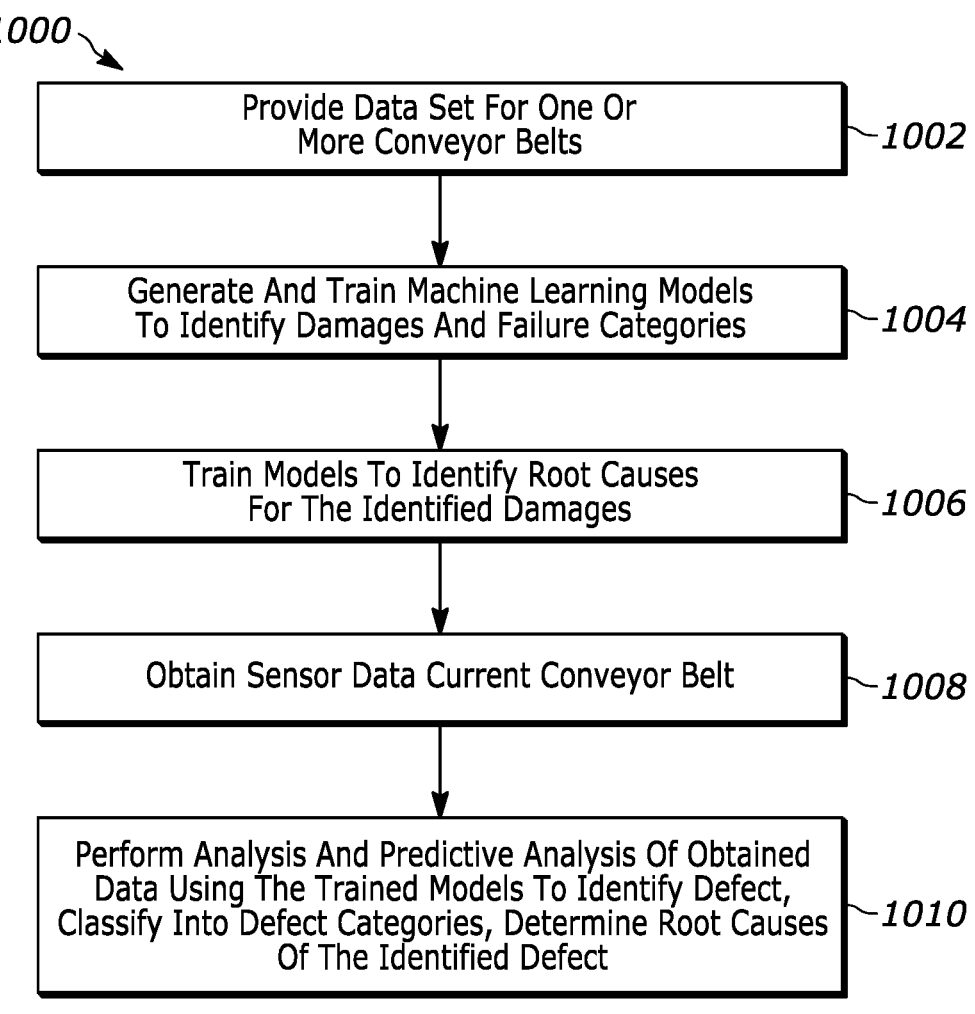

*1000*

Provide Data Set For One Or
More Conveyor Belts — *1002*

Generate And Train Machine Learning Models
To Identify Damages And Failure Categories — *1004*

Train Models To Identify Root Causes
For The Identified Damages — *1006*

Obtain Sensor Data Current Conveyor Belt — *1008*

Perform Analysis And Predictive Analysis Of Obtained
Data Using The Trained Models To Identify Defect,
Classify Into Defect Categories, Determine Root Causes
Of The Identified Defect — *1010*

FIG. 10

TOPOGRAPHICAL MONITORING OF CONVEYOR BELT SURFACE AND ROOT CAUSE DETERMINATION

TECHNICAL FIELD

The field to which the disclosure relates is rubber products, such as conveyor belts, which may be exposed to harsh conditions, and in particular, the use of sensors for scanning and/or monitoring defects in the surface of such products, including conveyor belts.

BACKGROUND

Heavy-duty conveyor belts are commonly utilized for transporting products and material. The conveyor belts so employed may be long, for example, on the order of miles, and represent a high-cost component of an industrial material handling operation. Such conveyor belts can be as large as ten feet wide, and possibly as thick as three inches. Typically, the main belt material is a moderately flexible elastomeric or rubber-like material, and the belt is typically reinforced by a plurality of longitudinally extending metal cables or cords, which are positioned within the belt and extend along the length thereof. Such conveyor belts are often used to transport bulk material below and/or above ground, for example, in mining applications. The conveyor belts are susceptible to normal wear and tear, which can include damage from the material being transported, the conveyor belt accessories, and/or harsh environmental conditions. In the event the conveyor belt cover is significantly degraded or damaged to a point that the reinforcing members are affected, then conveyor belt repairs or replacement could be the result. In either event, the cost of a catastrophic event or a shortened lifespan will both be expensive and result in reduced capacity due to associated downtimes.

SUMMARY

Because of the significant downtime and expense associated with repairing or replacing conveyor belts, conventional continuous monitoring systems are utilized to detect belt surface damage. However, these conventional systems that monitor conveyor belt cover damage typically only provide information related to an individual damage event, such as whether to perform a repair to the individual damage location in order to maintain belt integrity. Accordingly, at least one problem associated with conventional monitoring systems is that they do not employ a higher-level condition analysis to provide any indication of a root cause leading to the cover damage.

At least one aspect of the present disclosure overcomes one or more problems associated with conventional systems. More particularly, an aspect of the present disclosure provides a system and method that scans and/or monitors conveyor belt surfaces to determine defect(s), recognize defect patterns, and identify potential sources of the defect(s). Such monitoring techniques maximize the working life and integrity of conveyor belt applications while optimizing the process efficiency of the conveying process.

According to an aspect, a system for monitoring surface defect(s) of a conveyor belt to determine potential root cause(s), includes: at least one sensor configured to obtain information associated with at least one defect in or on a surface of a conveyor belt; and electronic circuitry operatively coupled to the at least one sensor to receive the information associated with the at least one defect, the electronic circuitry being configured to: identify the at least one defect based at least upon the information received from the at least one sensor; identify at least one defect pattern based at least upon the identified at least one defect, and identify one or more root causes based at least upon the identified at least one defect pattern.

Exemplary embodiments may have the electronic circuitry configured to identify the at least one defect based upon topographical variations in the surface of the conveyor belt.

The identifying the at least one defect and/or defect pattern may include topographically mapping a plurality of defects. The circuitry may be configured to track the at least one defect pattern for the conveyor belt over time and use information associated with the tracking to identify the one or more root causes.

The circuitry may be configured to utilize machine learning in identifying the at least one defect, in identifying the at least one defect pattern, and/or in identifying the one or more root causes associated with the at least one defect.

The machine learning may be at least partially based upon prior defect events of the system, and/or may be at least partially based upon prior defect events of one or more other remote systems.

According to another aspect, a method includes: running a conveyor belt; and using machine learning to perform one or more of: identifying at least one defect in or on the conveyor belt surface; identifying at least one defect pattern based at least upon the identified at least one defect, and identifying one or more root causes of the at least one defect based at least upon the identified at least one defect pattern.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

FIGS. 9A through 9C are diagrams illustrating an example of a potential defect pattern generated due to events associated with misalignment during the operation of the conveyor belt.

FIG. 10 is a flow diagram illustrating a method for determining root causes in accordance with one or more embodiments.

DETAILED DESCRIPTION

Conveyor belts typically include a top or carry cover and bottom or pulley cover layer, and a reinforcement layer between the top and bottom cover layers. The top and bottom cover layers are typically formed from a rubber material. The reinforcement layer may include reinforcing steel cords that are embedded in a rubber matrix to form a carcass of the belt. Alternatively, the reinforcing layer may be one or plies of a textile material. The top cover layer is typically exposed to the material being conveyed and may experience significant wear during the lifetime of the belt. As such, over time, the cover layer(s) can degrade, become damaged, and break. Given the cover is provided to protect the carcass, once the top cover wears down to the belt's reinforcement layer, the belt should be replaced as the reinforcing layer begins to be degraded resulting in the conveyor belt losing its strength or the ability to move the material as part of the conveying process.

At least one aspect of the present disclosure provides a system and method that scans and/or monitors the top and/or bottom cover surfaces of the belt to detect cover defect(s), recognize defect patterns, and identify potential sources of the defect(s). Additionally, the covers can be monitored for wear events, wear patterns and identify potential sources of the wear.

Embodiments of the present disclosure achieve this result by using empirical data collected on a specific conveyor process that had specific defect patterns which could be associated with a specific defect event, and by applying analysis tools to historical data sets containing many conveying applications with known conveyor design and processing criteria and the resulting defect patterns, in order to develop an algorithm tuned to facilitate the identification of a root cause(s) for that defect pattern.

Embodiments/systems for conveyor belt monitoring can analyze the defect patterns for trends that could potentially address active root causes that are causing belt defects. By adding this algorithm to the conveyor belt scanning technology, a tool is provided to accelerate the process of identifying and addressing the root cause of defect in conveyor belts, allowing the end user to potentially avoid additional belt damage and, as a result, extend the operational life and capacity of the conveyor system.

Figure 1:
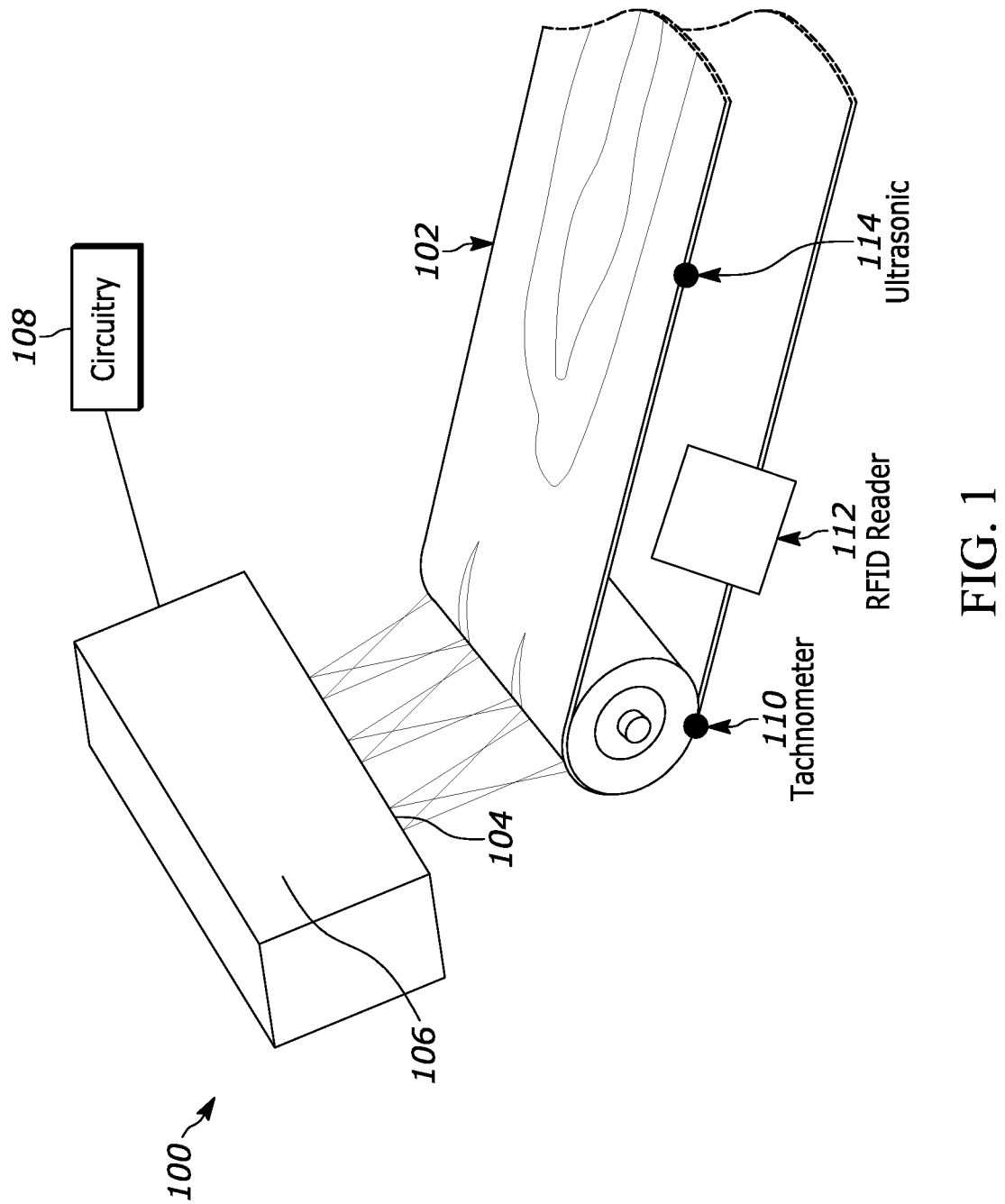
FIG. 1 is a diagram illustrating a system for conveyor belt defect detection, monitoring and analysis in accordance with one or more embodiments.

FIG. 1 is a diagram illustrating an exemplary system 100 for conveyor belt defect monitoring and root cause analysis in accordance with one or more embodiments. The system 100 is provided for illustrative purposes and it is appreciated that suitable variations are contemplated.

The system 100 can utilize sensor data associated with conveyer belt surface information to explore past conveyor belt surface defect data sets with known defect patterns and associated root causes for given belt designs, specific system designs and applications. Additionally, the system can study the development of the defect patterns over time to better isolate a specific root cause or causes. The system can utilize these datasets for training of an algorithm to identify defect patterns and associated potential root causes.

The conveyor belt monitoring system 100 can detect and spatially map belt surface defects using any suitable sensor technology. For example, the sensor technology may be configured to gather topographical information associated with the conveyor belt surface to detect defects, such as wear patterns, damage, and/or irregularities in the belt surface. Such topographical information for detecting defects may include variations in the topography of the belt surface, such as the dimensions of such defects, including for example the length, width and depth of cuts, gouges, wear regions, or the like. The sensor technology may include the use of optical scanning technologies. For example, the exemplary system 100 may use one or more laser surface profilers to assess the topography of the belt surface accurately. Such laser profiling technology may utilize laser triangulation techniques by emitting beam(s) of light (e.g., laser beam(s)) toward the belt surface, and the sensor(s) receive the reflected light from the belt surface. The reflected light creates a reflection angle relative to the surface normal, and the sensor(s) (e.g., camera or detector) is positioned at a known angle relative to the light source(s) to capture the reflected light and measure the angle at which the light arrives at the sensor(s). By knowing the angle of the light projection and the angle of light detection, the triangulation angle can be determined. By scanning the light source(s) across the belt's surface, multiple distance measurements are taken, creating a point cloud of 3D coordinates that represent the surface's profile. This enables the creation of a detailed 3D profile of the belt's surface, allowing for precise measurements and identification of defects. These defects may include wear, irregularities, or damage such as cuts, rips, cracks, splices, or other anomalies. It is of course understood that other measurement technique could be employed.

When the topographical information associated with the belt surface has been gathered and one or more defects in the belt surface has been detected, the system 100 may use information about the conveyor design, such as the separation of the skirt boards on the system, the position of the idler junction gaps, the diameters of the system pulleys, the belt transition lengths, or other conveyor system information. The system 100 may perform continuous monitoring of the conveyor belt surface using analytics to analyze defect events to identify patterns and associate these patterns with known and/or predefined root causes for the defects which would compromise the conveyor belt's integrity and ability to transport or convey material. Such defect patterns may include wear patterns, damage patterns, failure patterns, or the like.

In exemplary embodiments, the system 100 utilizes machine learning tools, artificial intelligence (AI), neural modeling, or the like, to define root causes from the specific application. The system 100 process (e.g., FIG. 10) can include a larger data set from one or more other conveyor systems used in different applications and can include a variety of different belt or conveyor system designs to generate insights to predict root causes of defects from a more global dataset.

The machine learning associated with the system 100 and the belt being monitored could be achieved using different methodologies and tool sets. In exemplary embodiments, the defect root cause analysis in the system's algorithm could be carried out by a two-step process. A first step could be defect pattern recognition, and could include defect classification based on the pattern recognition. Such defect pattern recognition and classification may be based upon any suitable information, such as an image, 3D model or the like. Defect pattern recognition and classification as it relates to images is an effective machine learning technique where an algorithm learns to recognize the objects in an image, based on the information, such as intensity, contrast, color, contours, etc., embedded in every pixel of the image. With the help of the neural network architectures or other such computational intelligence, the defect trends over time can be studied based on the progression of the image data. The images can range from (but not limited to) 1000×80 to 8000×320 pixels and are initially labelled manually by experts and categorized into different defect categories. Pre-processing using simple image processing techniques can aid in the extraction of important information from the images and enables better training and classification. The algorithm may be trained on 70% of the data and validated on the remaining 30% of the data. Cloud-based services like AWS, SageMaker, S3, ECS etc. can be utilized for data storage, training and hyperparameter tuning the model as well as for deploying the trained model for inference. The performance of the model could be monitored via mlflow using evaluation metrics like (overall and class-wise) accuracy, precision, recall, f1 score etc. Once the model is trained, it can be used in inference mode for predicting the defect classes for new batches of images. The model may be used to understand the progression of the defect in the form of the images and predict further damage or failure based on this defect pattern recognition.

After the defect information (e.g., image) has been classified into a defect category, the system 100 would correlate the defect pattern to its root cause. Statistical and technical data which have been observed to have been the root causes of defects or failures in the past could be collected and stored in a database. For example, this larger dataset could contain technical/structural design data which could include the composition and/or structure of the cover layers, the composition and/or structure of the reinforcement layer, such as reinforcing steel cord size and pitch (spacing), gauge and composition of the rubber pulley and carry covers, belt splice design, presence of transverse breaker material, details about the conveyor structure and process, such as the location and dimensions of accessories or the like. This may include technical design data related to the skirt board position, pulley dimensions, material drop height, cleaners, plows, idler configuration, belt design safety factor, drive power, etc. Statistical data could include belt surface defect rates, defect pattern development, conveyor belt alignment, etc. Observation of the progression of defects over time along with geometric inter-relationships between defects in images, and historical and contextual information to correlate to the specific defects, allows for a better prediction of the root cause for these defects which could result in further progression toward failure.

In order to take the defect pattern's development into consideration, time is another factor that may come into the analysis. As a result, the two-step analysis is carried out mainly using two configurations: the defect classification and pattern recognition for a defect or failure prediction is carried out at a local level, for example meaning the classification of the images into the various defect categories are fine-tuned to the local conveyor level. To account for the time component, the algorithm is trained to recognize the progression, or the trend of defect events based on large datasets of sequential images collected over a period, such as from multiple conveyors. The algorithm may be trained to identify the pixel-level changes in the sequence of images over time until it can predict the occurrence of a failure before it occurs. Hence, the classification is carried out at a local level, with a time and image-based analysis of the incoming data. For the second configuration, the root cause analysis of the defect is a systematic study. Monitoring of the root causes of defects or failures from data collected from configured systems across the globe can be used to correlate the progression of the defect in the images with local parameters from the conveyor (as mentioned above) by comparing them to previously recorded defect trends in other systems around the globe. This comparative analysis of all the data from all the systems across the globe and the defect progression in the images considers not just local conveyor settings and environmental conditions, but also the learnings of the causes of such defects/damages/failures from data coming from across the globe. Hence the analysis preferably is performed using cloud platforms like AWS, Azure, etc. for a higher-level insight into the pattern correlation and identification of the root cause.

As shown in FIG. 1, the exemplary system 100 includes one or more generators/emitters 104, one or more sensors 106, and electronic circuitry 108 operatively coupled to the emitter(s) 104 and/or sensor(s) 106 such that the system 100 is configured to detect defects in, or on, the top surface of a moving conveyor belt 102. As shown, the system 100 also may include additional sensors, such as an edge proximity sensor 114 that monitors the belt's lateral position to monitor its fleet or lateral position on the conveyor belt. Some other examples of suitable sensors include a tachometer 110, an RFID reader 112, or the like. This allows for more accurate alignment of the topographical defect data to the conveyor belt 102 and conveyor structure positions.

The conveyor belt 102 may be a composite of fabric, polymeric material and the like. For example, the belt may include a top and bottom cover layers, and a reinforcement layer between the top and bottom cover layers. The top and bottom cover layers are typically formed from a polymeric material, such as a rubber material, although other suitable materials also may be employed. The reinforcement layer may include longitudinal reinforcement elements, such as fiber, fabric, textile cords, steel cords or the like. The reinforcement layer also may include transverse reinforcement elements, such as fiber, fabric, textile cords, steel cords, or the like. The longitudinal reinforcement elements generally carry a majority of the load being conveyed.

Some example compositions of plies/layers for the belt 102 include: (i) Polymer-Textile #1-Textile #2- . . . -Textile #N-Polymer Layers (where there can be 1 to N textile-reinforcing layers); (ii) Polymer-Textile Breaker-Steel Cord-Polymer Layers; (iii) Polymer-Steel Cord-Textile Breaker-Polymer Layers; (iv) Polymer-Textile Breaker-Steel Cord-Textile Breaker-Polymer Layers; (v) Polymer-Textile Reinforcement-Steel Cord Breaker-Polymer Layers; (vi) Polymer-Steel Cord Breaker-Textile Reinforcement-Polymer Layers.

The belt 102 may be a continuous endless belt without splices, or may include one or more belt segments that are spliced together to form an endless belt. A single segment of the belt 102 is shown in FIG. 1 for illustrative purposes. Each segment generally begins and ends with a belt splice to form an endless conveyor belt.

As described above, the system 100 is configured to detect one or more defects in one or more surfaces of the conveyor belt 102, recognize defect patterns, which may include their development over time, and identify potential sources of the defects which may utilize computational intelligence (e.g., AI/Machine learning) tools to facilitate the identification of root cause for the defects in the belt and make the results of these analyses known to the customer or user to guide resolution by reducing or eliminating the source of the defects or root cause. Such a system limits further defect development, including potential damage or failure of the conveyor belt, and results in better maintenance of the belt and/or conveyor system. In other words, early detection of the defects and associated root cause(s) enables the user to get more life out of the conveyor belt and positively impact the material carrying capacity of the conveyor system.

In exemplary embodiments, from machine learning, the identification of the root cause accelerates the correction as to the source of the defect(s), which may be a result of the belt interacting with a failing conveyor component (pulleys, idlers, etc.) or wear of a maintenance item (pulley lagging, cleaners, skirt board, etc.). As a non-limiting example, the design of the conveyor system 100 may be known, including the relative transverse position of accessory structures (e.g., cleaner, skirt board, trough plows, etc.) that make contact or may make contact with the belt surface. As the system 100 detects defects and/or monitors the development of defect patterns over time, these defects may be correlated to the transverse section of the belt to identify the potential source of the defect, including the particular accessory. However, because there may be transverse overlap of the accessories relative to the belt surface, certain types of defects or their development may be indicative of the particular accessory being the root cause. For example, a cleaner may cause defects in terms of wear, whereas impact may generate defects in terms of more damage, while trapped material below a skirt board may generate defects in terms of both wear and damage. Using the computational intelligence (e.g., machine learning/AI) can accelerate the learning process to more expediently identify the root cause(s) of the defect(s). Thus, the health of the entire conveyor can be improved by identifying the root cause of the defect/damage. In some cases, the root cause may be design related and result in the need to make a change to the conveyor, such as increasing the transition length, reducing the material drop height or modifying the material flow within the chute, etc.

It is appreciated that the system 100 may monitor the top or bottom surfaces of the conveyor belt 102, and/or also may monitor the belt width. The ability to analyze defect(s) in these different surfaces or regions separately for systematic issues can improve the overall identification of root cause(s) associated with such defects. For example, defects in the bottom surface occur when the material becomes trapped between a conveyor pulley and the bottom surface of the belt. Alternatively, the top cover defects often are generated by the loading material impacting the belt and/or material getting caught in the conveyor system, like the skirtboards or within the chute. Hence, the algorithm of system 100 can also be used to identify different failure modes for the defect patterns observed in the different layers of the conveyor 102.

The emitter(s) 104 may include any suitable device(s) that emit an entity that interacts with the belt 102 for detecting the defect(s) in the belt cover layer(s). In exemplary embodiments, the emitter(s) include one or more optical emitters that emit light that interacts with the surface(s) of the belt 102 and then is reflected from the surface(s) for detection by the sensor(s). For example, the optical emitter(s) may include laser light emitter(s), also referred to as laser light source(s), that emit beam(s) of laser light at the conveyor belt surface(s). The laser light from the emitter(s) 104 can be a focused beam, a fanned beam (e.g., a line laser), a scanned beam, a divergent beam, or the like. The interaction of such laser light can include scattering, absorption, or other phenomena, which this reflected light contains valuable information about the surface, which is then captured by the sensor(s) 106 and analyzed by the electronic circuitry 108. The one or more emitters 104 of the system 100 may include an array of multiple emitters 104, or may include only a single emitter 104 that is configured to emit a beam that can be scanned across the entire width of the belt 102, or which may include a divergent or fanned beam that covers the entire lateral span of the belt 102. Generally, at least one emitter 104 will be used for each surface to be evaluated, such that an upper emitter may scan the top (carry) surface of the belt 102, and a lower emitter may scan the lower (pulley) surface of the belt. As understood by those skilled in the art, the lower emitter may be positioned within the conveyor system at an accessible location for scanning the lower surface, such as proximal a bend pulley where the lower surface faces outwardly.

The sensor(s) 106 may include any suitable device(s) that capture the response from the emitter(s) 104. In exemplary embodiments, the sensor(s) include light detection sensor(s) for capturing the reflected light emitted by the emitter(s) 104, which such sensor(s) 106 may include photodetectors, charged-coupled devices (CCDs), interferometric sensors, spectrometers, or the like. Such sensor(s) 104 may be incorporated into a device such as a camera. For example, the system 100 may include one or more optical cameras having at least one CCD for capturing and recording the reflected laser light from the emitter(s). The one or more sensors 106 of the system 100 may include an array of multiple sensors 106, or may include only a single sensor 106 that is configured to capture the reflected beam(s) of light across the entire width of the belt 102. Generally, at least one sensor 104 will be used for each surface to be evaluated, such that an upper sensor may capture the information from the top (carry) surface of the belt 102, and a lower sensor may capture information from the bottom (pulley) surface of the belt. These different sensors are allocated to their respective emitters 104 to capture the information of interest.

The electronic circuitry 108 is operatively coupled to the emitter(s) 104 and the sensor(s) 106 and is configured to control elements of the system 100, and read and process information according to aspects of the operation of the system 100. The electronic circuitry 108 may include one or more suitable controllers and/or processors for implementing such control and data processing. For example, the circuitry 108 may be configured to control the operation of laser emitter 104, such as power supply to the laser diode, modulating the laser's intensity or pulse duration, and/or controlling the scanning of the laser beam across the belt surface. The electronic circuitry 108 also interacts with the sensor(s) 106 used to capture the reflected light from the surface being analyzed. The circuitry 108 may coordinate the operation of the sensor(s) 106 and ensure synchronization with the laser emission for accurate data acquisition.

The electronic circuitry 108 also collects the raw data from the sensor(s) 106 as the reflected light is captured. Such data may be in the form of voltage levels, pixel intensities, or other sensor-specific measurements. The electronic circuitry 108 may include signal processing components, such as analog-to-digital converters (ADCs) and digital signal processors (DSPs), which convert analog sensor outputs into digital data and apply filters or algorithms to enhance the signal quality. Once the raw data has been processed, the circuitry 108 may have a suitable algorithm that oversees the data analysis and profiling process by coordinating the conversion of data into meaningful surface profiles, defect patterns (e.g., wear patterns), or other relevant information.

In exemplary embodiments, the circuitry 108 is configured to control the emitter(s) 104 and read information from the sensor(s) to determine the topographical information of the belt surface. A defect in the belt surface may then be determined by a change in the topography of the belt surface, such as reduced thickness in areas as a result of wear, or cuts, gouges, cracks or the like as a result of damage. This topographical information may include the dimensions of the defect (e.g., length, width, depth/height, shape) and the location of the defect on the belt (e.g., relative to a lateral edge or other lateral indicator; and/or relative to a splice or other lengthwise indicator). Such topographical information may be determined by using a laser triangulation algorithm (described above) that is programmed into the circuitry 108 for controlling the emitter(s) 104, reading information from the sensor(s) 106, and processing the information with the circuitry 108 to generate the topographical information, such as a point cloud of 3D coordinates that represent the belt surface topographical profile.

Examples of defect detection may include, but is not limited to: (i) wear detection, maximum depth, position from splice; (ii) deep groove detection, maximum length and depth of groove, position from splice; (iii) belt thickness deviation, maximum deviation, position from splice; (iv) belt edge damage, width and length, position from splice; (v) belt misalignment, amount out of alignment from center, position from splice.

As described above, the system 100 may use data from other conveyors across the globe and so the circuitry 108 also may include communication interfaces such as USB, Ethernet, or wireless connectivity. The circuitry 108 is not limited to the local circuitry 108 connected to the system 100, but also may include remote electronic circuitry (e.g., processors, controllers, etc.) located at other locations remote from the conveyor 102 and which is operatively connected via suitable communications link(s) (e.g., wired or wireless).

The circuitry 108 may also be configured to read or detect embedded elements, such as RFID tags and the like. In one example, the circuitry 108 includes an RFID reader 112. The detected embedded elements have known locations on the conveyor belt 102 and may be used to facilitate location of identified defects.

The circuitry 108 may also be configured to read or detect the lateral position of the conveyor belt using a sensor like the proximity sensor 114 to better quantify the lateral position of the conveyor belt. It is noted that there are many proximity sensor technologies that may monitor the transverse displacement of the belt that could include, but are not limited to, laser distance sensors, ultrasonic or capacitive sensors.

The circuitry 108 may also be configured to detect longitudinal position of the conveyor belt along the conveyor system length using a tachometer 110 to better monitor the position of the defect along the conveyor belt. The term tachometer is used, but it is understood that these could include, but are not limited to, encoders mounted to a conveyor pulley or idler, proximity sensors monitoring targets on the pulley, or a non-contact laser device that may measure the displacement and speed of conveyor belt.

The circuitry 108 may also be configured to identify alarm conditions and generate/trigger alarm notifications. The circuitry 108 may determine, for example, when new defect has occurred that has exceeded the minimum detection threshold values, generate a notification identifying the defect and, if necessary, generate an alarm with the location and size of the defect. In another example, the circuitry 108 can determine that a size of defect has exceeded a threshold value over time and generate an alarm based on the increasing size of the defect event.

The electronic circuitry 108 can include a user interface, such as a display screen and input controls. This interface allows the user to interact with the system, configure settings, initiate scans, and view or export the generated profiles and results.

Figure 2:
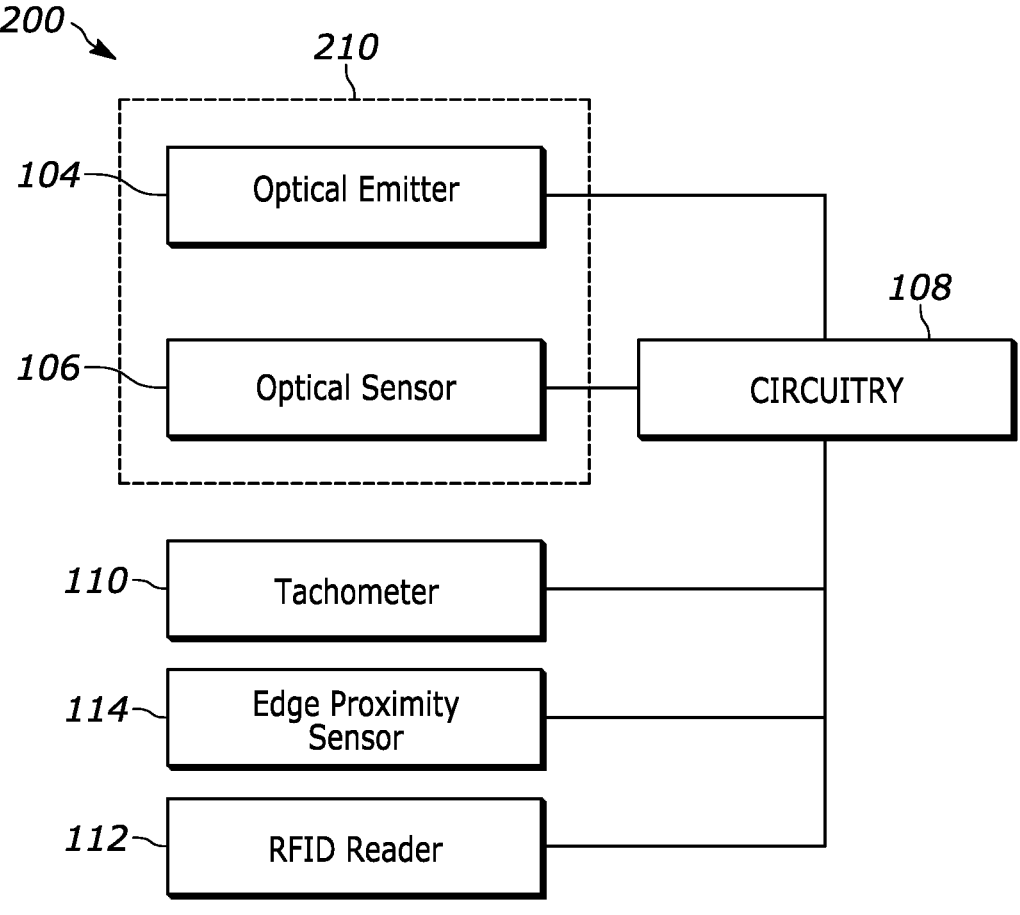
FIG. 2 is a diagram illustrating a system for monitoring a conveyor belt in accordance with one or more embodiments.

FIG. 2 is a diagram illustrating a system 200 for scanning a conveyor belt in accordance with one or more embodiments. The system 200 is substantially similar to the system 100 and includes additional details about circuitry 108. As such, it is understood that like reference numerals in the embodiments denote like elements, and thus the information described above for system 100 is equally applicable to system 200. The system 200 is provided for illustrative purposes and it is appreciated that suitable variations are contemplated.

Similarly to system 100, the system 200 includes one or more emitters 104 (e.g., optical emitters), one or more sensors 106 (e.g., optical sensors), and electronic circuitry 108 operatively coupled to the emitter(s) 104 and sensor(s) 106.

In exemplary embodiments, the circuitry 108 maps the defect and splice locations for one revolution of the conveyor belt 102, and this map is stored on the system. Such mapping may include topographical mapping as described above. The system then measures further movement of the belt and compares the new data with the previously recorded data. In exemplary embodiments of the system 100, the splice after the shortest segment is identified as splice number 1, and the splices detected afterwards are numbered sequentially. Similarly, the defects may then map sequentially based on the time of detection and position relative to the zero-reference point in the belt map. Alternatively or additionally to splices, other indicators (e.g., visual/RF, etc.) may be used for assessing positional relationship along the length of the belt. As the conveyor belt 102 operates, defects are mapped by their position along the length of the conveyor belt 102 and their transverse position relative to the edge of the belt. The circuitry 108 may utilize the methodology outlined above and below as input to the algorithm to initiate pattern recognition and potential root cause(s) for the defect events.

The circuitry 108 can explore past pattern data sets, with known root causes, to facilitate the generation of root cause insights from larger data sets including different conveyor designs and applications. The past data sets may include measured topographical information associated with known defect patterns, along with the known identified root cause associated with the specific defect pattern. In some cases, these patterns may be associated with spatial proximity to one another, to a position on the conveyor belt, or to the belt structural design elements, such as conveyor pulley, transition lengths, turn overs, take-ups, idlers, etc., or conveyor accessories, such as cleaner, scrapers, skirt boards, plows, etc. In other cases, the pattern data may be time dependent and as such the development of the defects over time could add a time dependency to the pattern development that could contribute to the identification of the root cause of defect.

The circuitry 108 can apply design knowledge of conveyor belts to determine the impact to the strength of the conveyor belt. The system 100 uses rules associated with how to react to a specific defect size as defined by common conveyor belt rules. The circuitry 108 uses specific defect separations and geometries to establish observed patterns in the topographical image data and using machine learning tools, for example, may apply a higher-level analysis to correlate the detected pattern to known root causes to provide insights on potential root causes for the defect events being observed. Additionally, by using the defect location in comparison to the conveyor's structural elements (e.g., accessories used with the conveyor), the system can also apply a higher-level analysis of the defect based on location and repeatability of defects. Examples of this could include; the defects are at a spacing aligned with a specific rotation of a pulley such that they are separated longitudinally by a distance equivalent or close to the pulley circumference, or whether the belt defects align with the location of idler junction gaps, or whether the defects align with the chute's skirt board structure, or if the frequency of the defect indicates a transition length in the belt is too short.

The circuitry 108 could also be configured to monitor pattern development to differentiate potential defect sources to facilitate the root cause identification process. In the event a given defect pattern has more than one associated root cause, the development of the defect pattern over time could also be used to facilitate the identification of the multiple root causes.

The circuitry 108 could utilize machine learning tools that could involve artificial intelligence (AI), or other methodology, this process could be taken to another level where data from one or more other conveyor systems with distinctive designs may be utilized to predict belt failure, outside of the belt design analyses that were conducted in the previous analysis.

In one example, the circuitry 108 includes a machine learning algorithm that is developed to identify a plurality of individual defect events as having a pattern and use this pattern to generate potential insights on the cause of the defect (root cause). The recognized pattern may be further analyzed against the known system configuration data to further tune the generated insights to a narrower set of root causes. This embodiment could be further enhanced if the data set was expanded to include the learnings of different conveyor belt designs operating on different conveyor structural designs and in different conveying applications, in order to maximize the potential learnings associated with pattern recognition and the resulting generation of root cause insights.

The following figures will illustrate and describe exemplary defects and/or defect patterns associated with one surface (e.g., the top carry surface) of the conveyor belt 102 that are used to generate insights into the root cause of the defect events. It is understood, however, that such defect and/or defect pattern recognition could be utilized in the same fashion on other surfaces of the belt, such as the lower (pulley) surface of the belt.

Figure 3A:
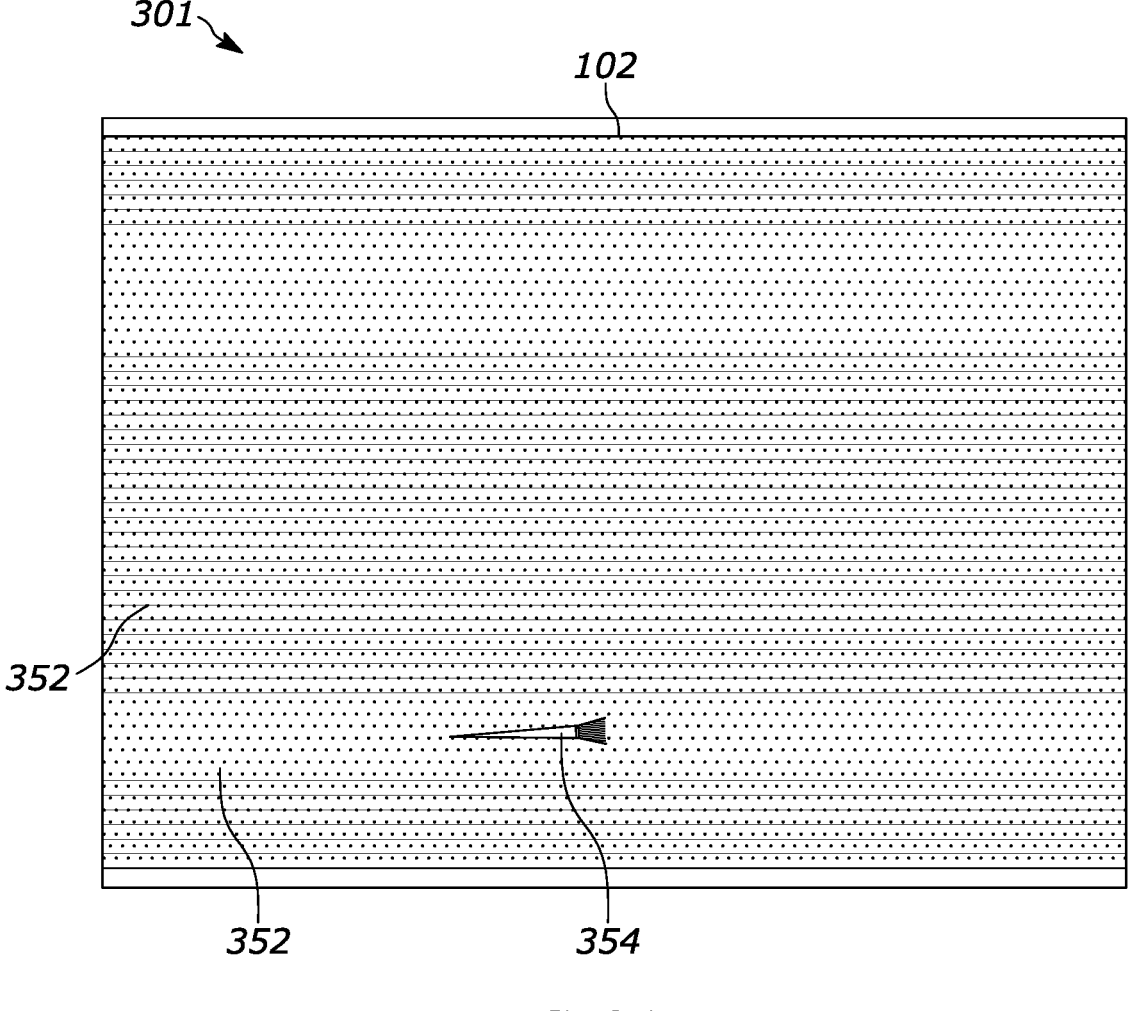
FIG. 3A is a diagram illustrating a topographical image depicting exemplary defect patterns on the surface of a conveyor belt, including a wear pattern and a point of damage.
Figure 3B:
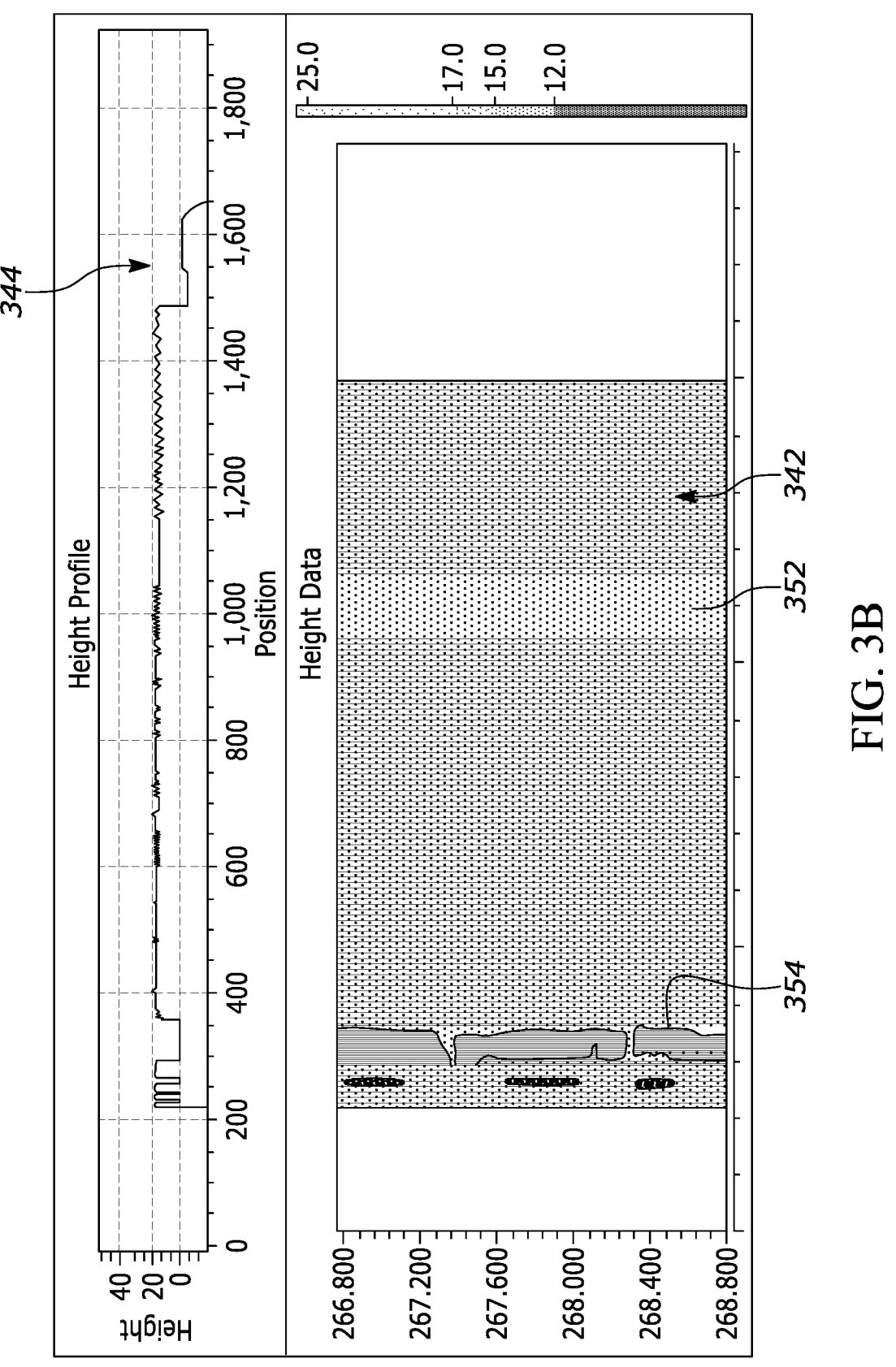
FIG. 3B is a diagram illustrating a topographical image on bottom and topographical data on top for the surface of a conveyor belt.

FIG. 3A is a diagram illustrating exemplary defect patterns 301 on the surface of a conveyor belt 102 in the form of a topographical image. FIG. 3B is a diagram illustrating defect patterns 301 in a topographical image 342 on bottom and topographical data (or topographical profile) 344 on top for the surface of a conveyor belt. As shown these illustrations, the emitter(s) 104 (FIGS. 1 and 2) may emit a laser line that covers the entire lateral extent of the belt 102, and the light from this laser line is reflected to the sensor(s) 106 (FIGS. 1 and 2) to capture data associated with the topography of the surface of the belt as analyzed by the circuitry 108. The laser line may be formed by one emitter 104 or multiple emitters 104. The topography of the surface of the belt may be output as image 342 and/or profile 344. As shown, changes in the topography due to defects 352, 354 are depicted in the topographical image 342 and the topographical profile 344. For example, defect 352 is illustrated as wear, and defect 354 may represent a depression, such as a cut, gouge, hole or the like.

Figure 4A:
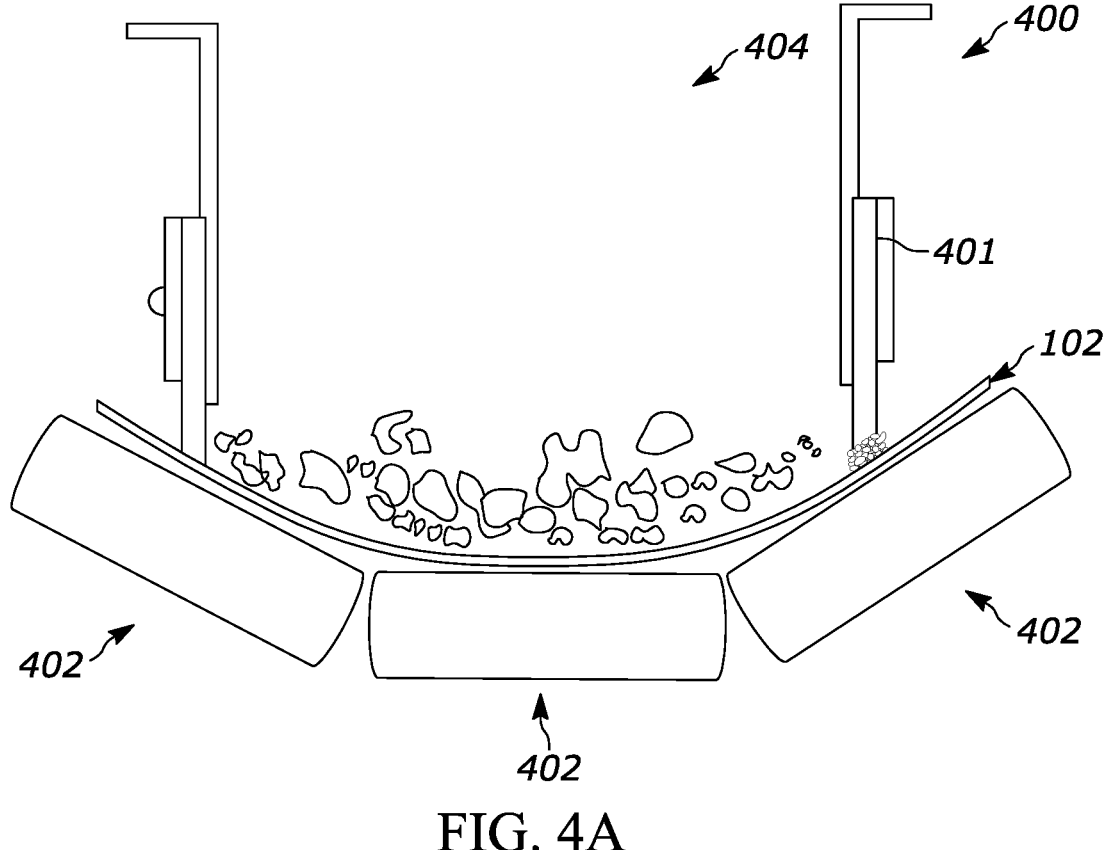
FIGS. 4A and 4B are diagrams illustrating a potential defect pattern in the form of wear generated by material that is trapped under a skirt board.
Figure 4B:
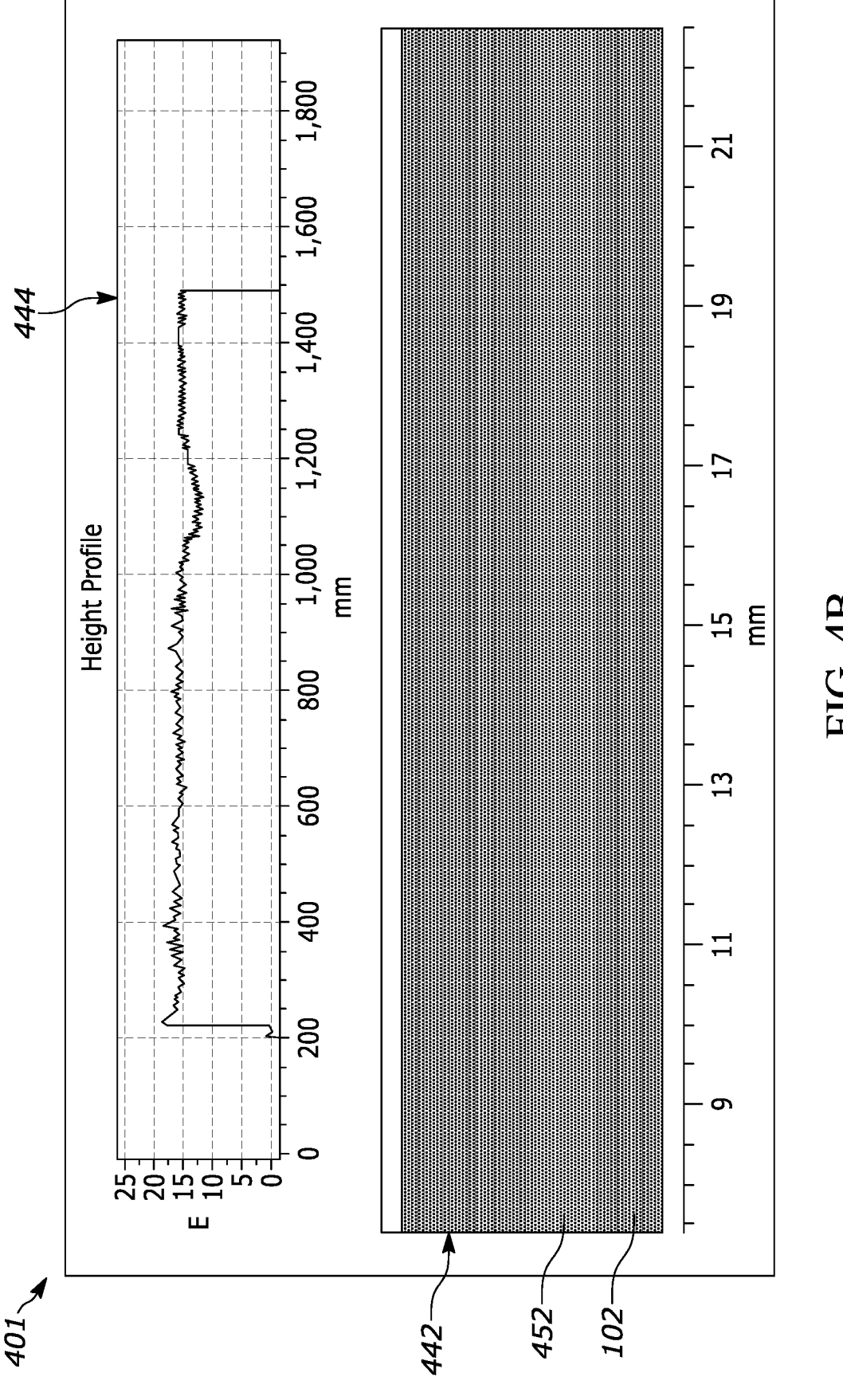

FIGS. 4A and 4B are diagrams illustrating a system 400 with an example of a potential defect pattern 401 that is generated due to material interactions with the skirt board 410 of the conveyor structure resulting in material becoming trapped between the skirt board 410 and the conveyor belt 102. FIG. 4A depicts a typical conveyor loading zone 404 where the material is contained by the skirt boards 410 on sides to minimize material spillage. The belt 102 is conveyed at least partially on carry idler rollers 402. FIG. 4B illustrates a potential defect pattern 401 including a topographical image 442 and profile information 444 that would be detected due to material interactions with the skirt board, such as an exemplary wear pattern 452

In the illustrated embodiment, the circuitry 108 would identify the pattern associated with this defect (e.g., wear) and correlate the identified defect pattern with the skirt board position and separation to confirm the specific root cause. It should be noted that a system configured with an ultrasonic edge tracking sensor would greatly assist in aligning conveyor belt defect to conveyor accessory and structural elements by providing the correlation of the belt position to the conveyor structure at the sensor(s) 106.

Figure 5A:
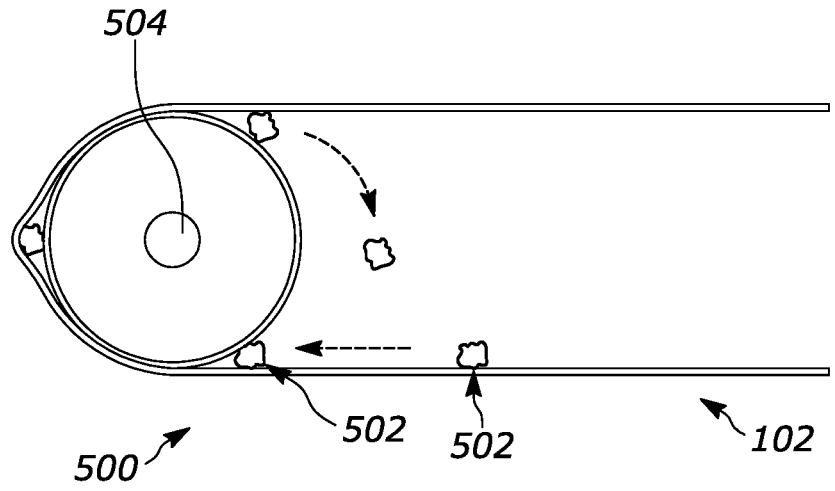
FIGS. 5A and 5B are diagrams illustrating an example of a potential defect pattern generated due to material interactions with a conveyor system pulley and the conveyor belt.
Figure 5B:
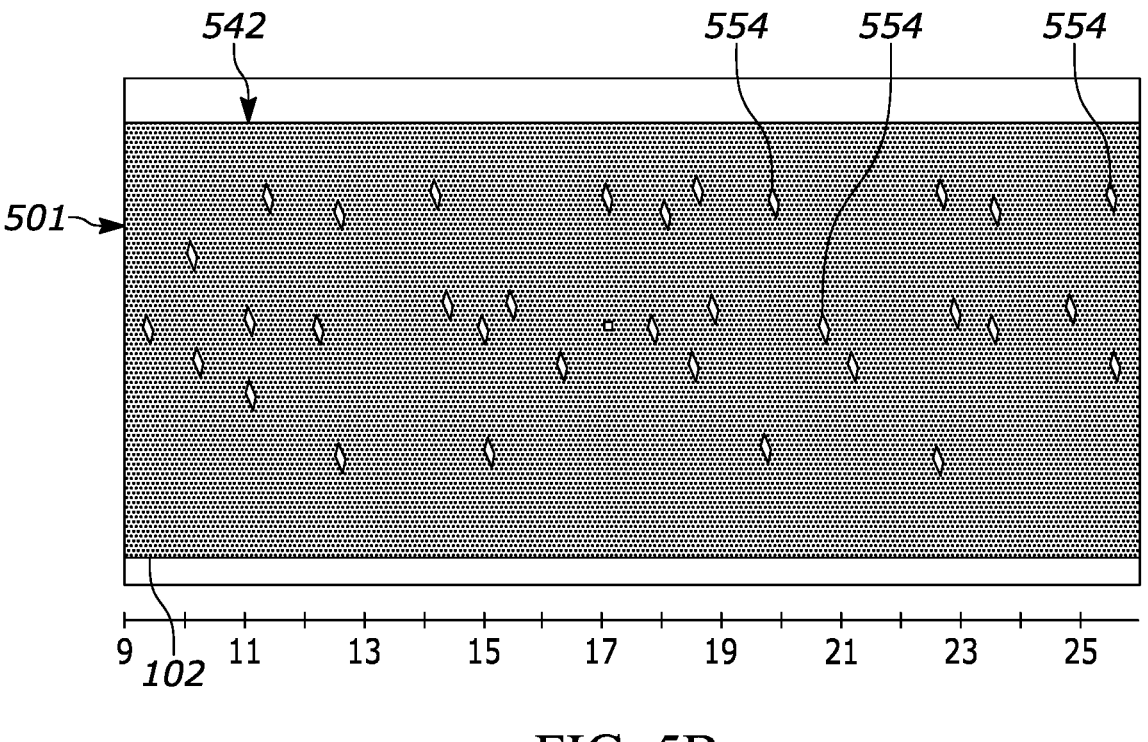

FIGS. 5A and 5B are diagrams illustrating a system 500 with an example of a potential defect pattern 501 (that is generated due to material interactions with a conveyor system pulley 504 and the conveyor belt 102, as a result of material 502 being trapped between the pulley and the conveyor belt. FIG. 5A shows the material 502 becoming trapped and being pulled into a pulley 504 generating high strain events in the conveyor belt 102 which can cause damage to the reinforcement, damage to the pulley cover, or possibly larger events that punch through the belt. In this illustration, the surface damage would be to the bottom (pulley) cover layer, which would be detected by suitable emitter(s) 104 and sensor(s) 106 directed at this bottom layer. FIG. 5B illustrates a potential defect pattern 501 that would be detected due to material interactions with the pulley 504. In the illustrated embodiment, the defect pattern 501 is depicted in topographical image 542 as a plurality of depressions or cuts 554 in the bottom cover layer. Since the material traveling between a conveyor pulley and the belt can occur during spillage events, this material can be 'trapped' between the pulley and the belt at any location across the belt and hence can have a more random damage pattern.

In the illustrated embodiment, the circuitry 108 would detect a random pattern of defect events that would potentially occur across the entire width of the conveyor belt 102. In this case, the defect pattern along with the development of the defect over time would be used by the machine learning algorithm in circuitry 108 in conjunction with the pulley width and skirt board positions, to assist in differentiating this defect from impact defect patterns that will be described in FIG. 6

Figure 6A:
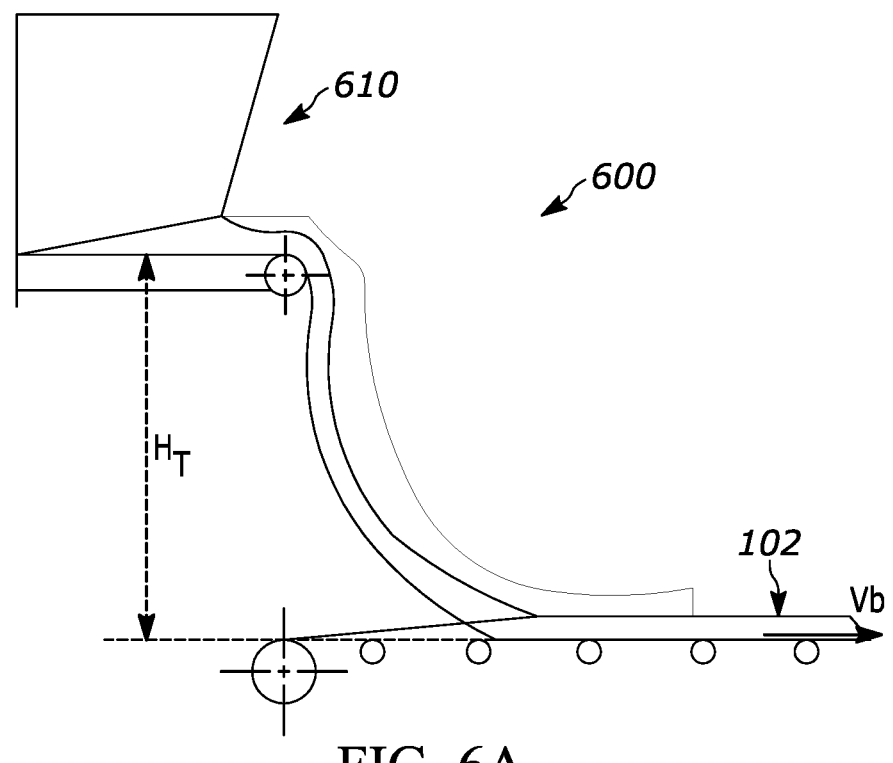
FIGS. 6A and 6B are diagrams illustrating an example of a potential defect pattern generated at the load chute due to material impacts with the conveyor belt.
Figure 6B:
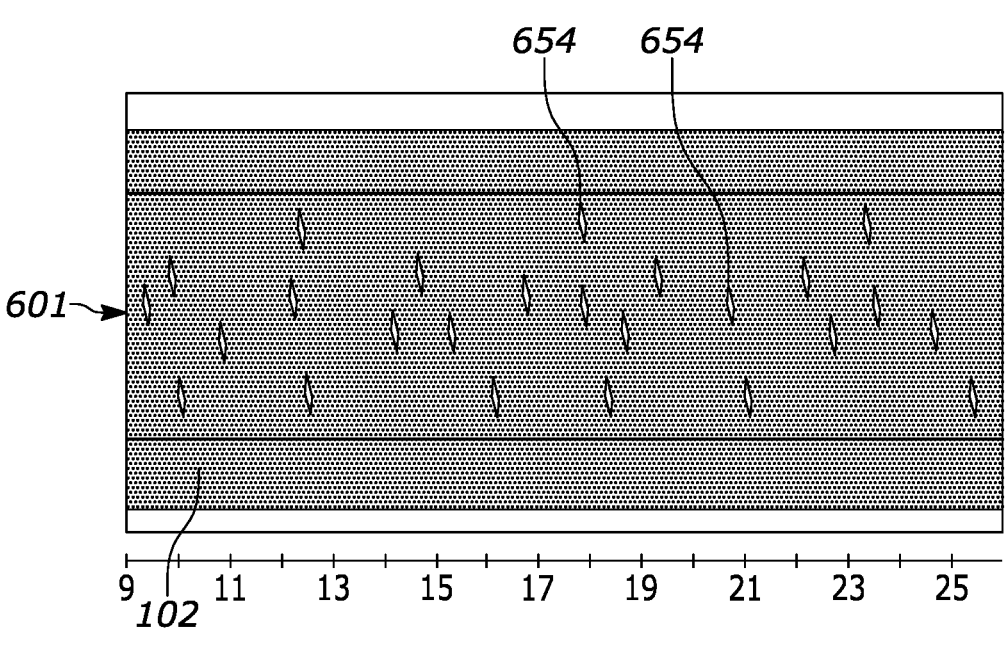

FIGS. 6A and 6B are diagrams illustrating a system 600 with an example of a potential defect pattern 601 that is generated at the load chute 610 due to material impacts with the conveyor belt 102. FIG. 6A illustrates the load chute 610, where material drops onto the conveyor belt 102 from a chute drop height Ht. Potential wear or equipment issues, oversized ore or higher impact forces due to damaged or missing impact plates, can lead to high impact forces on the conveyor belt resulting in defects in the surface of the conveyor belt 102. FIG. 6B illustrates a potential defect pattern 601 including defects 654 that would be detected due to high impact events damaging the conveyor belt surface across the loading area of the belt 102. Given that these impacts occur on the belt within the load chute, the impact damages occur in the top (carry) surface and occur within the chute structure or within the lines illustrated in FIG. 6B

In the illustrated embodiment, the circuitry 108, also could be configured to recognize the more randomized defect events of high impact events due to their location within the loading region of the belt. The described machine learning which would include the defect events and development of the defect pattern would facilitate the identification of the root cause associated with impact related defect.

Figure 7A:
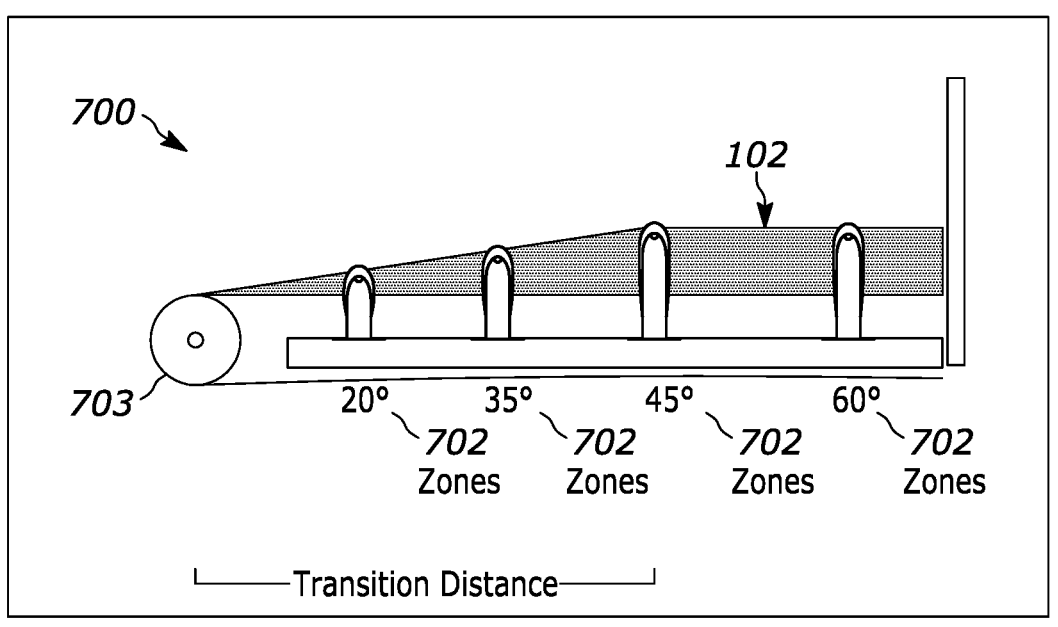
FIGS. 7A and 7B are diagrams illustrating an example of a potential periodic defect pattern generated due to events associated with transition zones.
Figure 7B:
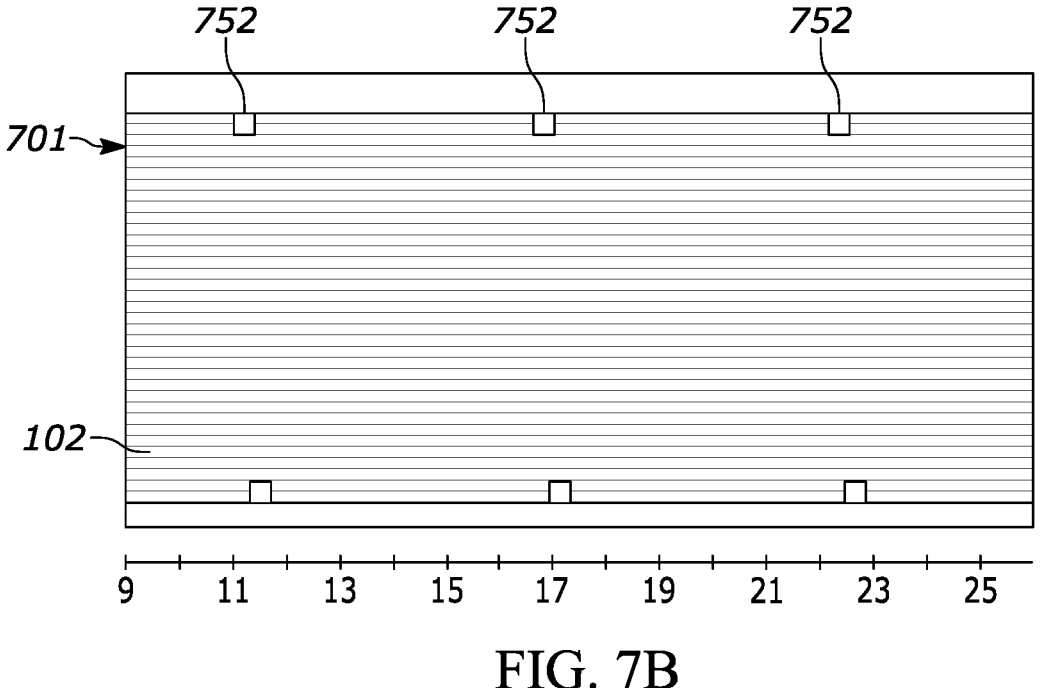

FIGS. 7A and 7B illustrate a system 700 with an example of a potential periodic edge defect pattern generated 701 due to events associated with transition zones 702 having a length (transition distance) or those associated with a rotational component of the conveyor, such as a conveyor pulley. In FIG. 7A, the length of the belts transition length is defined by the region where the belt changes from a flat configuration at the tail pulley to the trough configuration. FIG. 7B illustrates a potential defect pattern 701 including defects 752 such as in the form of repeating damage pattern at the edges of the belt where the reinforcement and covers could be damaged and detected due to transition zones 702. When a transition zone is too short by design or due to an idler set becoming displaced, the edge strains in the outside portion of the belt can result in reinforcement breaks and cover breaks when the strains exceed the specification of the belt, resulting in edge failures. Given this strain limit builds up over a given distance, these breaks are typically observed as regularly spaced damages on the edges of the belt.

In the illustrated embodiment, the circuitry 108 can detect periodic defect patterns, and the circuitry 108 could utilize the conveyor structure design elements to correlate defect and location of the defect to design elements, like any system pulley diameters, turn-over length, tail transition length, discharge transition length, or other structural element that could align with the periodic defect observed.

Figure 8A:
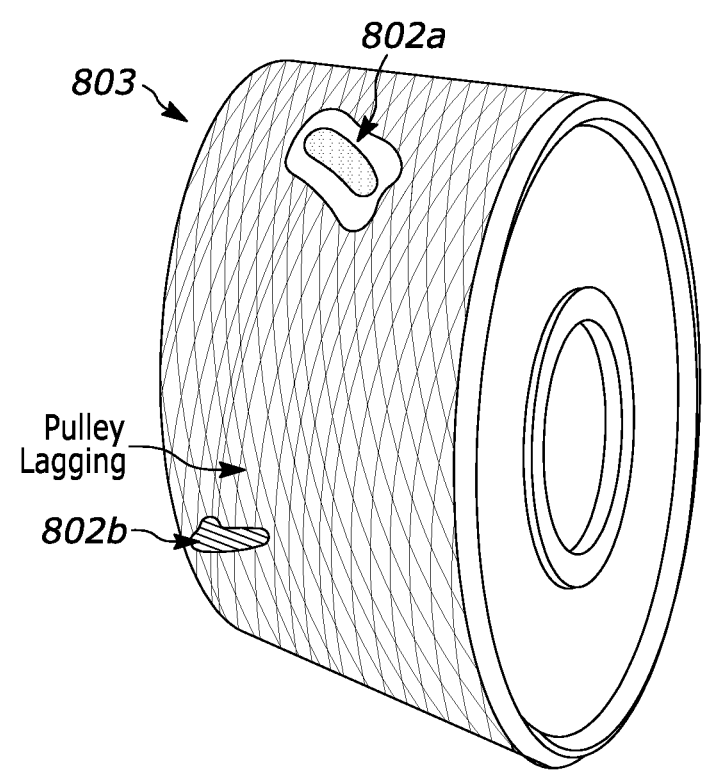
FIGS. 8A and 8B are diagrams illustrating an example of a potential periodic defect pattern generated due to events associated with a rotational component of the conveyor, such as a conveyor pulley with material trapped on pulley or missing lagging on the pulley.
Figure 8B:
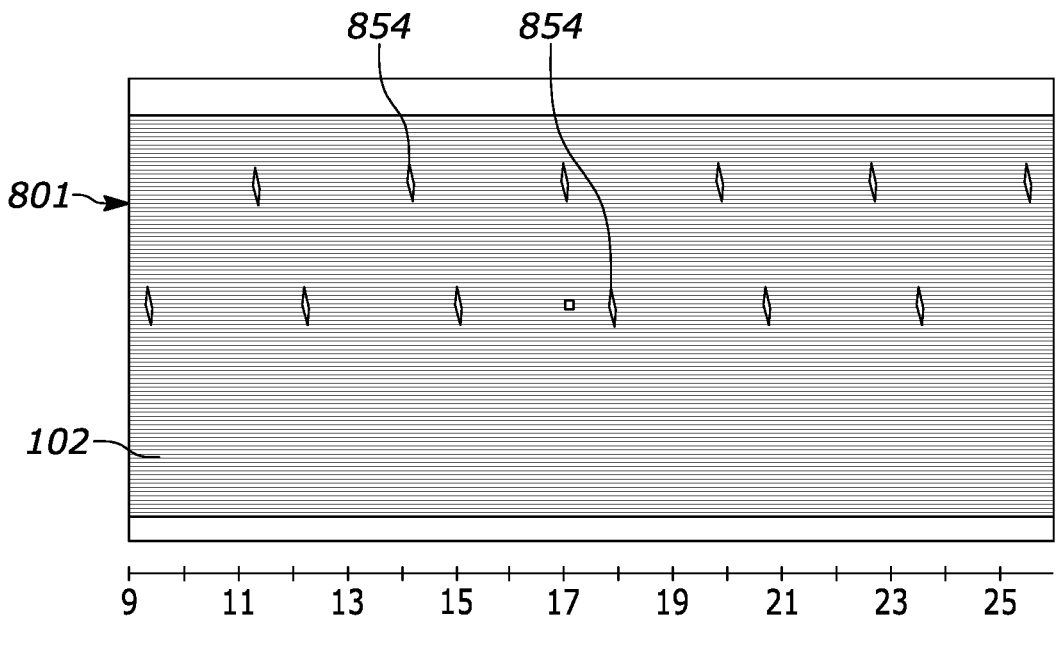

FIGS. 8A and 8B illustrate an example of a potential periodic defect pattern generated due to events associated with a rotational component of the conveyor, such as a conveyor pulley with material logged into the pulley or missing lagging on the pulley. A typical rubber lagged pulley 803 is shown in FIG. 8A in which at 802*a* lagging is missing and at 802*b* material is embedded in lagging. FIG. 8B illustrates a potential defect pattern 801 associated with pulley lagging buildup in which the defects 854 occur at distance associated with the circumference of the associated damaged pulley. It should be noted that material contamination or foreign material embedded on the pulley 803 would potentially have the same periodic damage effect as missing lagging. In this case, the damage pattern would occur rapidly and would correlate to the diameter of the pulley.

In such an illustrated embodiment, where periodic defect patterns are detected, the circuitry 108 could utilize the conveyor structure design elements to correlate defect and location of the defect to design elements, like any system pulley diameters, turn-over length, or other structural element that could align with the periodic defect observed.

FIGS. 9A-9C illustrate a system 900 with an example of a potential defect pattern 901 that is generated due to events associated with misalignment during the operation of the conveyor belt 102. FIGS. 9A and 9B show a conveyor belt 102 that is misaligned with the center line of the conveyor belt. Misalignment could be generated by damage or an internal defect within the conveyor belt, this could be a large damage event on the edge of the conveyor belt or a result of an asymmetry in the layout of a splice that joins two conveyor belt sections. Misalignment of the conveyor belt on the conveying system could also occur due to misalignment of the conveyor belt structural elements, such as an idler as shown in FIG. 9A. FIG. 9B shows material buildup 902 that can cause misalignment. When any of these root causes occur, the belt can move in the transverse direction away from the center of the conveyor with the potential to interact with the conveyor structure. If the belt does interact with the conveyor structure, damage can occur to the belt at the edge of the conveyor belt 102. FIG. 9C illustrates the resulting defect pattern 901 that could be generated by this interaction. As shown, when the conveyor belt 102 interacts with the conveyor structure, belt edge damage could occur, resulting in edge cuts 954 that could grow over time and result in cable breaks extending into the belt. In some cases, these transverse edge cracks 954 can result in edge flaps that can interact with the structure and result in longitudinal rips at the edge of the belt, stripping the edge of the conveyor belt which can lead to reduced carry capacity or potentially a catastrophic belt damage resulting in the need to replace the conveyor belt.

In the illustrated embodiment, depending on the root cause, this defect could be intermittent and localized or occur over the entire length of the conveyor belt. The circuitry 108 could utilize the machine learning of the defect pattern and development of the defect pattern to generate accurate root cause insights that will accelerate the identification and resolution of the defect generating event.

Figure 11:
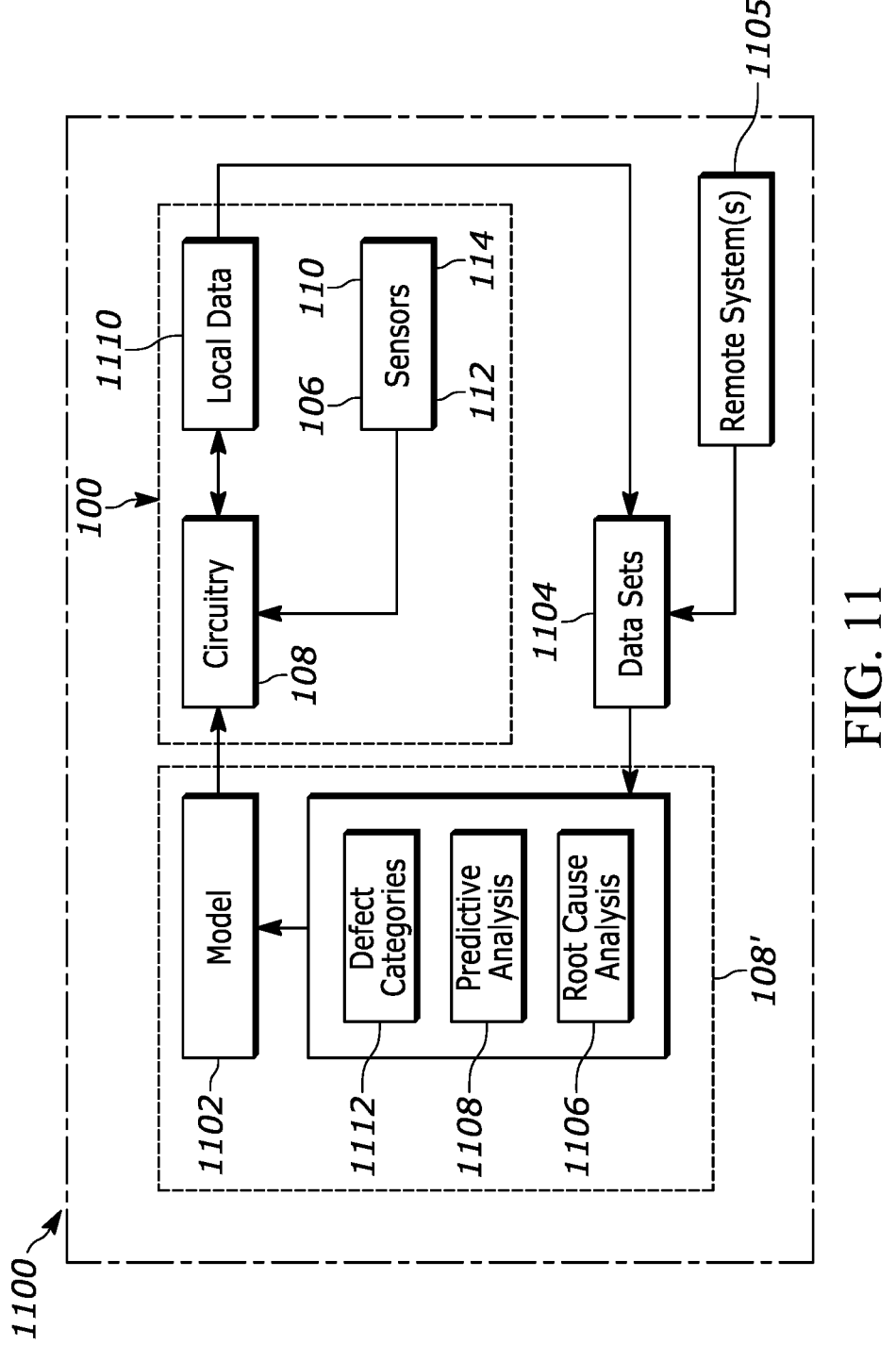
FIG. 11 is a diagram illustrating a system for determining root causes.

FIG. 10 is a flow diagram illustrating an exemplary method 1000 for determining root causes in accordance with one or more embodiments according to the present disclosure. The method 1000 may be used with or by the system 100 and/or variations thereof. FIG. 11 is a diagram illustrating a system 1100 for determining root causes. The system 1100 in FIG. 11 may incorporate or be incorporated into the system 100 and/or variations thereof as described herein. The system 1100 also may include other remote system(s) 1105 that can contribute to providing data sets 1104 which are incorporated into a model 1102. The system 1100 in FIG. 11 may use the method 1000 in FIG. 10 as an algorithm for determining such root causes, and therefore FIGS. 10 and 11 will be described below in conjunction with each other. Of course, it is understood that multiple emitters 104 and sensors 106 can be used to monitor both top and bottom covers as part of this data set for a particular conveyor system.

At step 1002, data set 1104 is provided. The data set 1104 may include information (e.g., patterns or images) from prior monitoring of the system 100 and include correlation to defects, or the like. As described above, such data may include topographical image data and/or topographical profile data of the surface of the belt generated by the emitter(s) 104, sensor(s) 106, and circuitry 108. This information may be captured as local data 1110 and stored in data set 1104. As shown in FIG. 11, and described above, such data sets 1104 alternatively or additionally may include information from remote system(s) 1105. Such information in the data sets 1104 from system 100 and/or system 1105 may include defect recognition, pattern identification, prior root cause analysis, system design (belt design, accessories, etc.), or the like, as described above.

As shown in FIG. 11, data sets 1104 from the system 100 and/or remote system(s) 1105 may be processed to identify failure categories 1112, provide predictive analysis 1108 of the progression of defects, provide root cause analysis 1106 of the source generator of the defects, or the like. This processing may be done by electronic circuitry 108', which can be separate, integrated, or the same as circuitry 108 described above. In other words, electronic circuitry as described herein may encompass an overall architecture of circuitry for system 100, system 1100, remote system(s) 1105, etc.

At step 1004, the system 1100 trains machine learning model(s) 1102 to identify defects and/or failure categories 1112 using the data set 1104.

At step 1006, the system 1100 trains the machine learning models 1102 to identify root causes 1106 using the data sets 1104. The system 100 also may train the machine learning models 1102 with predictive analysis 1108. The training of the model 1102 with information (e.g., failure categories 1112, predictive analysis 1108, root cause analysis 1106, etc.) may be iterative.

At step 1008, the system 1100 generates and/or obtains local data 1110 for a conveyor system 100 using the sensor(s) 106 and circuitry 108.

At step 1010, the circuitry 108 of system 100 analyzes the local data 1110 using the trained models 1102 to identify defects, identify defect patterns (and may include classifying the defects into defect categories), and determine root causes of the identified defects.

As shown in FIG. 11, this information can be a closed-loop architecture to continue the learning process. The system 1100 may utilize machine learning, neural networks or the like, as shown and/or described above, to operate.

It is envisioned that they system(s), method(s)/process(es) described herein can solve one or more problems associated with the identification of the root cause of observed defect events in the conveyor belt, by automating the process utilizing the proposed system/method that applies computational intelligence, such as machine learning and higher-level analytics, from data collected from the local conveyor of interest, as well as conveyors across the globe, to generate root cause insights that can be quickly verified and corrected by the end user. This solution shortens the time associated with root cause identification and allows for corrective actions to take place to eliminate the source of the defect generator, thus saving the end user money and downtime, while extending the working life of the conveyor belt and thus increasing the functional capacity of that belt operation due to the increased operational life.

According to an aspect, a system for monitoring surface defect(s) of a conveyor belt to determine potential root cause(s), includes: at least one sensor configured to obtain information associated with at least one defect in or on a surface of a conveyor belt; and electronic circuitry operatively coupled to the at least one sensor to receive the information associated with the at least one defect, the electronic circuitry being configured to: (i) identify the at least one defect based at least upon the information received from the at least one sensor; (ii) identify at least one defect pattern based at least upon the identified at least one defect, and (iii) identify one or more root causes based at least upon the identified at least one defect pattern.

According to another aspect, a method includes: running a conveyor belt; and using machine learning to perform one or more of: (i) identifying at least one defect in or on the conveyor belt surface; (ii) identifying at least one defect pattern based at least upon the identified at least one defect, and (iii) identifying one or more root causes of the at least one defect based at least upon the identified at least one defect pattern.

According to another aspect, a non-transitory computer readable medium storing program code which when executed by one or more processors performs at least the steps: identifying at least one defect in or on the conveyor belt surface; identifying at least one defect pattern based at least upon the identified at least one defect, and identifying one or more root causes of the at least one defect based at least upon the identified at least one defect pattern.

Exemplary embodiment(s) may include one or more of the following additional features combined with any of the foregoing aspects, in which one or more of these additional features may be combined separately or in any suitable combination with each other.

In exemplary embodiment(s), the system includes at least one light emitter configured to emit light, in particular laser light, that is reflected from the surface of the conveyor belt; the at least one sensor includes at least one light detection sensor that is configured to receive the light reflected from the surface of the conveyor belt; and the electronic circuitry is configured to identify the at least one defect based upon variations in the reflected light received by the at least one light detection sensor.

In exemplary embodiment(s), the electronic circuitry is configured to identify the at least one defect based upon topographical variations in the surface of the conveyor belt.

In exemplary embodiment(s), the topographical variations are determined using a plurality of light reflections that form datapoints which form a three-dimensional topographical profile of the surface of the belt.

In exemplary embodiment(s), the identifying the at least one defect pattern includes identifying a spatial relation of the at least one defect relative to a predefined belt location and/or relative a position of an accessory of the system as related to its position relative to the belt.

In exemplary embodiment(s), the identifying the at least one defect pattern includes identifying a plurality of defects and a spatial relation of the plurality of defects relative to each other and/or relative to a predefined belt location.

In exemplary embodiment(s), the identifying the at least one defect pattern includes identifying a progression of the at least one defect or a plurality of defects over time.

In exemplary embodiment(s), the circuitry is configured to classify the at least one defect pattern into a defect category based upon the identification of the at least one defect pattern.

In exemplary embodiment(s), the identifying the at least one defect pattern includes topographically mapping a plurality of defects, and the topographical mapping includes determining a transverse location and a longitudinal location of each identified defect.

In exemplary embodiment(s), the circuitry is configured to track the at least one defect pattern for the conveyor belt over time and use information associated with the tracking to identify the one or more root causes.

In exemplary embodiment(s), the circuitry is configured to utilize machine learning in the identifying the at least one defect.

In exemplary embodiment(s), the circuitry is configured to utilize machine learning in the identifying the at least one defect pattern.

In exemplary embodiment(s), the circuitry is configured to utilize machine learning in the identifying the one or more root causes associated with the at least one defect.

In exemplary embodiment(s), the machine learning is at least partially based upon prior defect events of the system.

In exemplary embodiment(s), the machine learning includes data from one or more systems that are remote from a system having the conveyor belt.

In exemplary embodiment(s), the machine learning is at least partially based upon prior defect events of one or more other systems that are remote from the system.

In exemplary embodiment(s), the machine learning is at least partially based upon structural design data of the system that impact one or more regions of the conveyor belt.

In exemplary embodiment(s), the machine learning is at least partially based upon structural design data of one or more other systems that are remote from the system.

In exemplary embodiment(s), the identifying the at least one defect includes generating at least one image of the at least one defect.

In exemplary embodiment(s), the machine learning is at least partially based upon image classification and pattern recognition of information in the at least one image that is generated.

In exemplary embodiment(s), the circuitry is configured to utilize a tachometer to provide longitudinal location data associated with the identification of the at least one defect.

In exemplary embodiment(s), the circuitry is configured to utilize a proximity sensor to measure the position of the edge of the belt to provide transverse belt position associated with the identification of the at least one defect.

In exemplary embodiment(s), the circuitry is configured to utilize an RFID reader to identify and track specific defects relative to a unique traceable belt position.

In exemplary embodiment(s), the circuitry evaluates the one or more root causes and classifies the one or more root causes according to severity, and the circuitry generates an alarm based on the classified one or more root causes.

According to another aspect, a conveyor includes: a conveyor belt, at least one structure that interacts or causes an interaction with the conveyor belt, and the system according to any of the foregoing aspects or embodiment(s) separately or in any suitable combination, wherein the circuitry is configured to identify the one or more root causes associated with the at least one structure based at least upon the identification of the defect pattern.

The foregoing description of the embodiments has been provided for purposes of illustration and description. Example embodiments are provided so that this disclosure will be sufficiently thorough and will convey the scope to those who are skilled in the art. Numerous specific details are set forth such as examples of specific components, devices, and methods, to provide a thorough understanding of embodiments of the disclosure but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

In the flow diagram(s), blocks denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques. Methodologies in the flow diagram(s) or otherwise described herein may be implemented as processor executable instructions or operations provided on a computer-readable medium. Thus, in one example, a computer-readable medium may store processor executable instructions operable to perform such a method. "Logic," as used herein, includes but is not limited to hardware, firmware, software or combinations of each to perform a function(s) or an action(s), or to cause a function or action from another logic, method, or system.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an Application Specific Integrated Circuit, a Digital Signal Processor, a Field Programmable Gate Array, a Programmable Logic Controller, a Complex Programmable Logic Device, a discrete gate or transistor logic, discrete hardware components, or any combination thereof designed to perform the functions and/or processes described herein. Processors can exploit nanoscale architectures such as, but not limited to, molecular and quantum-dot based transistors, switches and gates, in order to optimize space usage or enhance performance of mobile devices. A processor may also be implemented as a combination of computing processing units.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. Thus, while a particular feature may have been described with respect to only one or more of several embodiments, such feature may be combined with one or more other features of the other embodiments, separately or in any combination. The same may also be varied in many ways. Such variations are not to be regarded as a departure from the disclosure, and all such modifications are intended to be included within the scope of the disclosure. as may be desired and advantageous for any given or particular application.

Any background information contained in this disclosure is to facilitate a better understanding of the various aspects described herein. It should be understood that any such background statements are to be read in this light, and not as admissions of prior art. Likewise, the description and examples are presented herein solely for the purpose of illustrating the various embodiments of the disclosure and should not be construed as a limitation to the scope and applicability of the disclosure.

The phrase "and/or" as used in this disclosure should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" as used in this disclosure should be understood as being inclusive and not exclusive. For example, when separating items in a list, "or" or "and/or" shall be interpreted as being inclusive, i.e., the inclusion of at least one, but also including more than one, of a number or list of elements, and, optionally, additional unlisted items. For example, a condition A or B is satisfied by anyone of the following: A is true (or present) and B is false (or not present), A is false (or not present) and B is true (or present), and both A and B are true (or present). Only terms clearly indicating exclusivity should be interpreted as indicating exclusive alternatives (i.e. "one or the other but not both"), such as "either," "only one of," or "exactly one of." In other words, such terms of exclusivity refer to the inclusion of exactly one element of a number or list of elements.

Any references to "one embodiment" or "an embodiment" as used herein is understood to mean that a particular element, feature, structure, or characteristic described in connection with the embodiment is included in at least one embodiment. The appearances of the phrase "in one embodiment" in various places in the specification are not necessarily referring to the same embodiment.

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The word "exemplary" is used herein to mean "serving as an example or illustration." Any aspect or design described herein as "exemplary" is not necessarily to be construed as preferred or advantageous over other aspects or designs. Likewise, the phrases "particularly," "preferably," or the like as used in this disclosure may refer to an element or value that provides preferable advantage(s) in some embodiment(s), however is not intended to limit the scope of the disclosure to those "particular" or "preferable" features.

Transitional language such as "including," "comprising," "having," "containing," "involving," or variations thereof, is intended to be broad and encompass the subject matter listed thereafter, equivalents, and additional subject matter not recited, i.e., to be open-ended and meaning including but not limited to.

It is to be understood that terms such as "top," "bottom," "upper," "lower," "left," "right," "front," "rear," "forward," "rearward," or the like may refer to an arbitrary frame of reference, rather than to the ordinary gravitational frame of reference.

Spatially relative terms, such as "inner", "adjacent", "outer", "beneath", "below", "lower", "above", "upper", "top," "bottom," "left," "right," "front," "rear," "forward," "rearward," or the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. Thus, these terms may refer to an arbitrary frame of reference, rather than to the ordinary gravitational frame of reference. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Although the invention has been shown and described with respect to a certain embodiment or embodiments, it is apparent that equivalent alterations and modifications will occur to those having ordinary skill in the art upon the reading and understanding this disclosure, and such modifications are intended to be included within the scope of this disclosure as defined in the claims. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure.

What is claimed is:

1. A system for monitoring surface defect(s) of a conveyor belt to determine potential root cause(s), the system comprising:

at least one sensor configured to obtain information associated with at least one defect in or on a surface of a conveyor belt; and electronic circuitry operatively coupled to the at least one sensor to receive the information associated with the at least one defect, the electronic circuitry being configured to:

(i) Identify the at least one defect based at least upon the information received from the at least one sensor, the information comprising topographical variations in the surface of the conveyor belt;

(ii) identify at least one defect pattern based at least upon the identified at least one defect, and (iii) identify one or more root causes based at least upon the identified at least one defect pattern by using empirical data collected on a specific conveyor process that had specific defect patterns which could be associated with a specific defect event, by applying analysis tools to historical data sets containing conveying applications with known conveyor design and processing criteria and resulting defect patterns, or by studying development of the identified at least one defect pattern over time.

2. The system according to claim 1, wherein:

the system includes at least one light emitter configured to emit light that is reflected from the surface of the conveyor belt;

the at least one sensor includes at least one light detection sensor that is configured to receive the light reflected from the surface of the conveyor belt; and the electronic circuitry is configured to identify the at least one defect based upon variations in the reflected light received by the at least one light detection sensor.

3. The system according to claim 1, wherein the topographical variations are determined using a plurality of light reflections that form datapoints which form a three-dimensional topographical profile of the surface of the belt.

4. The system according to claim 1, wherein:

the identifying the at least one defect pattern includes identifying a spatial relation of the at least one defect relative to a predefined belt location and/or relative a position of an accessory of the system as related to its position relative to the belt; and/or the identifying the at least one defect pattern includes identifying a plurality of defects and a spatial relation of the plurality of defects relative to each other and/or relative to a predefined belt location; and/or the identifying the at least one defect pattern includes identifying a progression of the at least one defect or a plurality of defects over time.

5. The system according to claim 1, wherein:

the circuitry is configured to classify the at least one defect pattern into a defect category based upon the identification of the at least one defect pattern.

6. The system according to claim 5, wherein:

the identifying the at least one defect pattern includes topographically mapping a plurality of defects, and the topographically mapping includes determining a transverse location and a longitudinal location of each identified defect, and the circuitry is configured to track the at least one defect pattern for the conveyor belt over time and use information associated with the tracking to identify the one or more root causes.

7. The system according to claim 1, wherein:

the circuitry is configured to utilize machine learning in the identifying the at least one defect; and/or the circuitry is configured to utilize machine learning in the identifying the at least one defect pattern; and/or the circuitry is configured to utilize machine learning in the identifying the one or more root causes associated with the at least one defect.

8. The system according to claim 7, wherein:

the machine learning is at least partially based upon prior defect events of the system; and/or the machine learning is at least partially based upon prior defect events of one or more other systems that are remote from the system.

9. The system according to claim 7, wherein:

the machine learning is at least partially based upon structural design data of the system that impact one or more regions of the conveyor belt; and/or the machine learning is at least partially based upon structural design data of one or more systems tat are remote from the system.

10. The system according to claim 7, wherein:

the identifying the at least one defect includes generating at least one image of the at least one defect, and the machine learning is at least partially based upon image classification and pattern recognition of information in the at least one image that is generated.

11. The system according to claim 10, wherein:

the circuitry is configured to utilize a tachometer to provide longitudinal location data associated with the identification of the at least one defect.

12. The system according to claim 1, wherein:

the circuitry is configured to utilize a proximity sensor to measure the position of the edge of the belt to provide transverse belt position associated with the identification of the at least one defect.

13. The system according to claim 1, wherein:

the circuitry is configured to utilize an RFID reader to identify and track specific defects relative to a unique traceable belt position.

14. The system according to claim 1, wherein:

the circuitry evaluates the one or more root causes and classifies the one or more root causes according to severity, and the circuitry generates an alarm based on the classified one or more root causes.

15. A conveyor comprising:

a conveyor belt, at least one structure that interacts or causes an interaction with the conveyor belt, and the system according to claim 1, wherein the circuitry is configured to identify the one or more root causes associated with the at least one structure based at least upon the identification of the defect pattern.

16. A method comprising:

running a conveyor belt; and using machine learning to perform one or more of:

(i) identifying at least one defect in or on the conveyor belt surface based at least upon topographical variations in the surface of the conveyor belt;

(ii) identifying at least one defect pattern based at least upon the identified at least one defect, and (iii) identifying one or more root causes of the at least one defect based at least upon the identified at least one defect pattern by using empirical data collected on a specific conveyor process that had specific defect patterns which could be associated with a specific defect event, by applying analysis tools to historical data sets containing conveying applications with known conveyor design and processing criteria and resulting defect patterns, or by studying development of the identified at least one defect pattern over time.

17. The method according to claim 16, wherein the machine learning includes data from one or more systems that are remoteoperating different conveyor belt designs from a system having the conveyor belt.

18. A non-transitory computer readable medium storing program code which when executed by one or more processors performs at least the steps:

(i) Identifying at least one defect in or on the conveyor belt surface based at east upon topographical variations in the surface of the conveyor belt;

(ii) identifying at least one defect pattern based at least upon the identified at least one defect, and (iii) identifying one or more root causes of the at least one defect based at least upon the identified at least one defect pattern by using empirical data collected on a specific conveyor process that had specific defect patterns which could be associated with a specific defect event, by applying analysis tools to historical data sets containing conveying applications with known conveyor design and processing criteria and resulting defect patterns, or by studying development of the identified at least one defect pattern over time.

* * * * *